United States Patent
Anguiano

(10) Patent No.: US 11,659,225 B2
(45) Date of Patent: May 23, 2023

(54) SYSTEMS AND METHODS FOR TARGETED TELEVISION COMMERCIALS BASED ON VIEWER PRESENCE

(71) Applicant: DISH Network L.L.C., Englewood, CO (US)

(72) Inventor: Jason Michael Anguiano, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 235 days.

(21) Appl. No.: 16/660,297

(22) Filed: Oct. 22, 2019

(65) Prior Publication Data
US 2020/0053410 A1    Feb. 13, 2020

Related U.S. Application Data

(63) Continuation of application No. 16/051,497, filed on Aug. 1, 2018, now abandoned.
(Continued)

(51) Int. Cl.
*H04N 21/2668* (2011.01)
*H04N 21/45* (2011.01)
(Continued)

(52) U.S. Cl.
CPC ..... *H04N 21/2668* (2013.01); *G06Q 30/0255* (2013.01); *G06Q 30/0269* (2013.01);
(Continued)

(58) Field of Classification Search
None
See application file for complete search history.

(56) References Cited

U.S. PATENT DOCUMENTS

| 8,171,148 B2 | 5/2012 | Lucas et al. |
| 8,910,199 B2 * | 12/2014 | Slaney ............... H04N 21/4415 725/34 |

(Continued)

OTHER PUBLICATIONS

U.S. Appl. No. 16/051,497, "Non-Final Office Action", dated Apr. 4, 2019, 20 pages.
(Continued)

*Primary Examiner* — Jason K Lin
(74) *Attorney, Agent, or Firm* — Kilpatrick Townsend & Stockton

(57) ABSTRACT

Systems and methods for targeted television commercials based on viewer presence. For example, a computer-implemented method may include receiving user information associated with multiple users of the set-top box; receiving a set of television commercials; detecting the presence of multiple mobile devices in the environment; identifying the presence of a first user of the multiple users and a second user of the multiple users using the detection of the presence of the multiple mobile devices in the environment; transmitting programming content to a display device associated with the set-top box in response to an input, wherein when the programming content is received, the programming content is presented on the display device; identifying, by the set-top box, an open commercial slot within the programming content; analyzing data associated with the first user, data associated with the second user, the programming content, and the open commercial slot to determine a chosen television commercial of the set of television commercials to fill the open commercial slot; and transmitting the chosen television commercial to the display device for the chosen television commercial to be displayed on the display device within the open commercial slot within the programming content.

20 Claims, 10 Drawing Sheets

Related U.S. Application Data

(60) Provisional application No. 62/611,838, filed on Dec. 29, 2017.

(51) Int. Cl.

| | | |
|---|---|---|
| *H04N 21/433* | (2011.01) | |
| *H04N 21/436* | (2011.01) | |
| *H04N 21/458* | (2011.01) | |
| *H04N 21/442* | (2011.01) | |
| *G06Q 30/0251* | (2023.01) | |
| *H04N 21/81* | (2011.01) | |

(52) U.S. Cl.
CPC ... *H04N 21/4331* (2013.01); *H04N 21/43615* (2013.01); *H04N 21/44218* (2013.01); *H04N 21/44226* (2020.08); *H04N 21/458* (2013.01); *H04N 21/4532* (2013.01); *H04N 21/812* (2013.01)

(56) References Cited

U.S. PATENT DOCUMENTS

| | | | |
|---|---|---|---|
| 8,997,142 B2* | 3/2015 | Agarwal | H04N 7/16 |
| | | | 725/34 |
| 9,015,225 B2 | 4/2015 | Paul et al. | |
| 9,178,923 B2 | 11/2015 | Paul et al. | |
| 9,565,460 B1* | 2/2017 | Dey | H04N 21/812 |
| 2002/0049635 A1* | 4/2002 | Mai | H04N 21/4331 |
| | | | 705/14.66 |
| 2010/0023966 A1* | 1/2010 | Shahraray | H04N 21/47 |
| | | | 725/34 |
| 2010/0077174 A1* | 3/2010 | Ma | G06F 9/5011 |
| | | | 711/171 |
| 2011/0178876 A1 | 7/2011 | Karaoguz et al. | |
| 2015/0020097 A1 | 1/2015 | Freed et al. | |
| 2015/0026708 A1 | 1/2015 | Ahmed et al. | |
| 2015/0281824 A1* | 10/2015 | Nguyen | H04R 1/1041 |
| | | | 381/74 |
| 2016/0253710 A1 | 9/2016 | Publicover et al. | |
| 2017/0245106 A1 | 8/2017 | Connelly et al. | |
| 2019/0191204 A1* | 6/2019 | Fryer | H04N 21/458 |

OTHER PUBLICATIONS

PCT/US2018/066737, "International Preliminary Report on Patentability", dated Jul. 9, 2020, 8 pages.
PCT/US2018/066737, "International Search Report and Written Opinion", dated Mar. 14, 2019, 11 pages.

* cited by examiner

SYSTEMS AND METHODS FOR TARGETED TELEVISION COMMERCIALS BASED ON VIEWER PRESENCE

CROSS-REFERENCE TO RELATED APPLICATIONS

This application is a continuation of U.S. Non-Provisional application Ser. No. 16/051,497 entitled SYSTEMS AND METHODS FOR TARGETED TELEVISION COMMERCIALS BASED ON VIEWER PRESENCE, filed Aug. 1, 2018, which claims priority to U.S. Provisional Application No. 62/611,838 entitled SYSTEMS AND METHODS FOR TARGETED TELEVISION COMMERCIALS BASED ON VIEWER PRESENCE, filed Dec. 29, 2017, the disclosure of which is incorporated by reference herein in its entirety.

TECHNICAL FIELD

The present technology relates to systems and methods for targeting television commercials based on viewer presence. More specifically, the present technology relates to a media service system that detects user presence and uses dynamic analysis to target users based on their characteristic data.

BACKGROUND

Television and streaming ads are generally generic for the audience assumed to be watching the content being watched at a particular time. For example, if a cartoon is being viewed, ads directed to children may be used because it is assumed that the demographic for cartoons are children. While certain targeting-based advertising may be used based on subscriber information and data associated with the subscriber, people other than the subscriber are likely to be viewing television content at various times. Therefore, improvements are necessary.

SUMMARY

Embodiments of the present technology include systems and processes associated with targeted television commercials based on viewer presence. For example, a computer-implemented method may include receiving, at a set-top box in an environment, user information associated with multiple users of the set-top box; receiving, by the set-top box, a set of television commercials; detecting, by the set-top box, the presence of multiple mobile devices in the environment; identifying, by the set-top box, the presence of a first user of the multiple users and a second user of the multiple users using the detection of the presence of the multiple mobile devices in the environment; transmitting, by the set-top box, programming content to a display device associated with the set-top box in response to an input, wherein when the programming content is received, the programming content is presented on the display device; identifying, by the set-top box, an open commercial slot within the programming content; analyzing, by the set-top box, data associated with the first user, data associated with the second user, the programming content, and the open commercial slot to determine a chosen television commercial of the set of television commercials to fill the open commercial slot; and transmitting, by the set-top box, the chosen television commercial to the display device for the chosen television commercial to be displayed on the display device within the open commercial slot within the programming content. The above steps may be implemented as instructions stored in a computer-readable medium, computer program product, or device such as a television receiver, or in other types of embodiments.

BRIEF DESCRIPTION OF THE DRAWINGS

A further understanding of the nature and advantages of the disclosed embodiments may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology relates to systems and methods for targeting television commercials based on viewer presence. More specifically, the present technology relates to a media service system that detects user presence and uses dynamic analysis to target users based on their characteristic data.

One or more users may be detected in an environment using mobile devices that are present in the environment and/or other sensors associated with a media service system. Data associated with the users may allow the system to strategically determine which television commercials may be used to target the users that are present in the environment. Dynamic analysis may be performed using data, including user characteristics, associated with present users to determine how commercials should be weighted or ranked for each user and their profile, and how that information will change over time.

Figure 1:
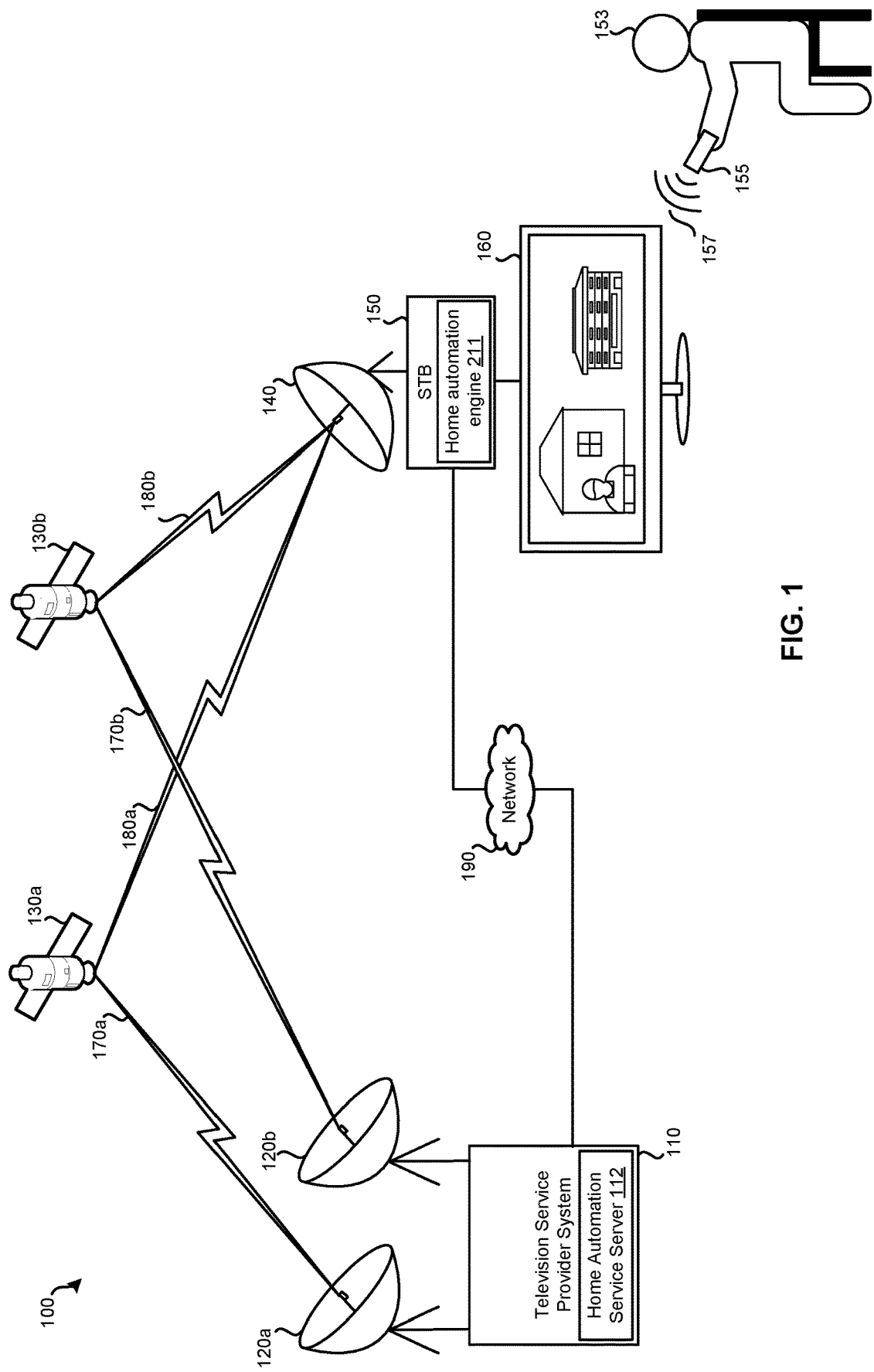
FIG. 1 illustrates an embodiment of a satellite television distribution system that may be used in accordance with embodiments of the present technology.

FIG. 1 illustrates an embodiment of a satellite television distribution system 100 that may be used in accordance with embodiments of the present technology. Satellite television distribution system 100 may include: television service provider system 110 (including, for example, home automation service center 112), satellite transmitter equipment 120, satellites 130, satellite dish 140, television receiver 150, and display device 160. The display device 160 can be controlled by a user 153 using a remote control device 155 that can send wired or wireless signals 157 to communicate with the STB 150 and/or display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130. While a home automation system may be incorporated with various types of television receivers, various embodiments may be part of a satellite-based television distribution system. Cable, IP-based, wireless, and broadcast focused systems are also possible.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may also be relayed to a television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130a. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
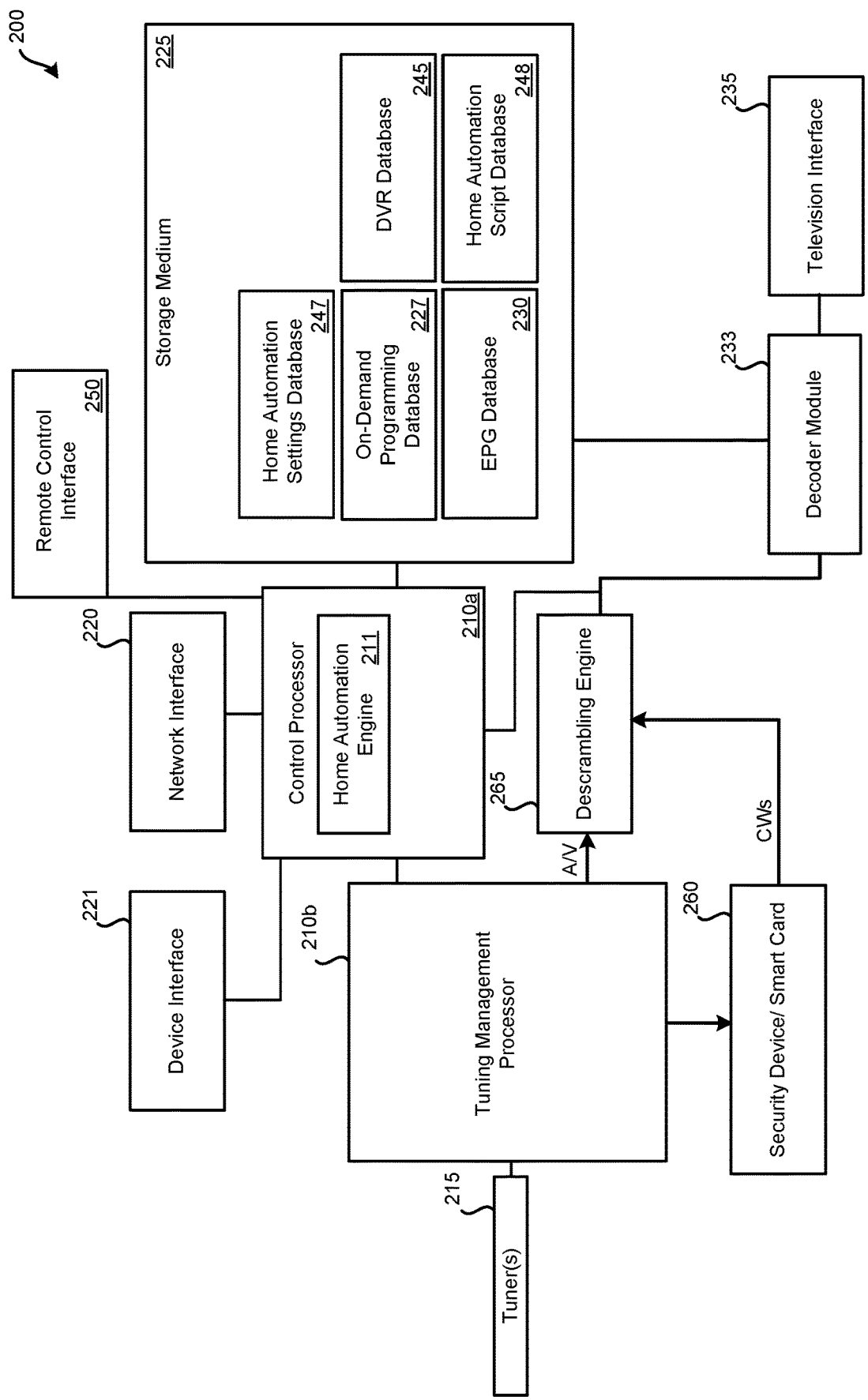
FIG. 2 illustrates an example electronic device that may be used in accordance with embodiments of the present technology.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs), and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 211, as detailed in relation to FIG. 2.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170a represents a signal between satellite transmitter equipment 120 and satellite 130a. Uplink signal 170b represents a signal between satellite transmitter equipment 120 and satellite 130b. Each of uplink signals 170 may contain streams of one or more different television channels. For example, uplink signal 170a may contain a first group of television channels, while uplink signal 170b contains a second group of television channels. Each of these television channels may be scrambled such that unauthorized persons are prevented from accessing the television channels.

Downlink signal 180a represents a signal between satellite 130a and satellite dish 140. Downlink signal 180b represents a signal between satellite 130b and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180a may be a first transponder stream containing a first group of television channels, while downlink signal 180b may be a second transponder stream containing a different group of television channels. In addition to or instead of containing television channels, a transponder stream can be used to transmit on-demand content to television receivers, including PPV content, which may be stored locally by the television receiver until output for presentation.

FIG. 1 illustrates downlink signal 180a and downlink signal 180b, being received by satellite dish 140 and distributed to television receiver 150. For a first group of television channels, satellite dish 140 may receive downlink signal 180a and for a second group of channels, downlink signal 180b may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. Although illustrated as part of the television service provider system, the home automation service server 112 may be provided by a third party in embodiments. In addition or in alternate to network 190, a telephone, e.g., landline, or cellular connection may be used to enable communication between television receiver 150 and television service provider system 110.

FIG. 2 illustrates an embodiment of a television receiver 200, which may represent television receiver 150 of FIG. 1 that may be used in accordance with embodiments of the present technology. Television receiver 200 may be in the form of a separate device configured to be connected with a display device, such as a television. Embodiments of television receiver 200 can include set top boxes (STBs). In addition to being in the form of an STB, a television receiver may be incorporated as part of another device, such as a television, other form of display device, video game console, computer, mobile phone or tablet, or the like. For example, a television may have an integrated television receiver, which does not involve an external STB being coupled with the television. Television receiver 200 may also be configured to function as a host for a home automation system either alone or in conjunction with a communication device.

Television receiver 200 may be incorporated as part of a television, such as display device 160 of FIG. 1. Television receiver 200 may include: processors 210, which may include control processor 210a, tuning management processor 210b, and possibly additional processors, tuners 215, network interface 220, non-transitory computer-readable storage medium 225, electronic programming guide (EPG) database 230, television interface 235, digital video recorder (DVR) database 245, which may include provider-managed television programming storage and/or user-defined television programming, on-demand programming database 227, home automation settings database 247, home automation script database 248, remote control interface 250, security device 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210b. Further, functionality of components may be spread among additional components.

Processors 210 may include one or more specialized and/or general-purpose processors configured to perform processes such as tuning to a particular channel, accessing and displaying EPG information from EPG database 230, and/or receiving and processing input from a user. It should be understood that the functions performed by various modules of FIG. 2 may be performed using one or more processors. As such, for example, functions of descrambling engine 265 may be performed by control processor 210a.

Control processor 210a may communicate with tuning management processor 210b. Control processor 210a may control the recording of television channels based on timers stored in DVR database 245. Control processor 210a may also provide commands to tuning management processor 210b when recording of a television channel is to cease. In addition to providing commands relating to the recording of television channels, control processor 210a may provide commands to tuning management processor 210b that indicate television channels to be output to decoder module 233 for output to a display device. Control processor 210a may also communicate with network interface 220 and remote control interface 250. Control processor 210a may handle incoming data from network interface 220 and remote control interface 250. Additionally, control processor 210a may be configured to output data via network interface 220.

Control processor 210a may include home automation engine 211. Home automation engine 211 may permit television receiver and control processor 210a to provide home automation functionality. Home automation engine 211 may have a JSON (JavaScript Object Notation) command interpreter or some other form of command interpreter that is configured to communicate with wireless devices via network interface 220 and a message server, possibly via a message server client. Such a command interpreter of home automation engine 211 may also communicate via a local area network with devices without using the Internet. Home automation engine 211 may contain multiple controllers specific to different protocols; for instance, a ZigBee® controller, a Z-Wave® controller, and/or an IP camera controller, wireless LAN, 802.11, may be present. Home automation engine 211 may contain a media server configured to serve streaming audio and/or video to remote devices on a local area network or the Internet. Television receiver may be able to serve such devices with recorded content, live content, and/or content recorded using one or more home automation devices, such as cameras.

Tuners 215 may include one or more tuners used to tune to transponders that include broadcasts of one or more television channels. Such tuners may be used also to receive for storage on-demand content and/or addressable television commercials. In some embodiments, two, three, or more than three tuners may be present, such as four, six, or eight tuners. Each tuner contained in tuners 215 may be capable of receiving and processing a single transponder stream from a satellite transponder or from a cable network at a given time. As such, a single tuner may tune to a single transponder stream at a given time. If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210b. Such commands may instruct tuners 215 to which frequencies are to be tuned.

Network interface 220 may be used to communicate via an alternate communication channel with a television service provider, if such communication channel is available. A communication channel may be via satellite, which may be unidirectional to television receiver 200, and the alternate communication channel, which may be bidirectional, may be via a network, such as the Internet. Data may be transmitted from television receiver 200 to a television service provider system and from the television service provider system to television receiver 200. Information may be transmitted and/or received via network interface 220. For instance, instructions from a television service provider may also be received via network interface 220, if connected with the Internet. Besides the primary communication channel being satellite, cable network, an IP-based network, or broadcast network may be used. Network interface 220 may permit wireless communication with one or more types of networks, including using home automation network protocols and wireless network protocols. Also, wired networks may be connected to and communicated with via network interface 220. Device interface 221 may represent a USB port or some other form of communication port that permits communication with a communication device as will be explained further below.

Storage medium 225 may represent one or more non-transitory computer-readable storage mediums. Storage medium 225 may include memory and/or a hard drive. Storage medium 225 may be used to store information received from one or more satellites and/or information received via network interface 220. Storage medium 225 may store information related to on-demand programming database 227, EPG database 230, DVR database 245, settings database 247 (e.g., home automation settings database), and/or script database 248 (e.g., home automation script database). Recorded television programs may be stored using storage medium 225 as part of DVR database 245. Storage medium 225 may be partitioned or otherwise divided, such as into folders, such that predefined amounts of storage medium 225 are devoted to storage of television programs recorded due to user-defined timers and stored television programs recorded due to provider-defined timers.

Settings database 247 may allow configuration settings of devices (e.g., home automation devices) and user preferences to be stored. Settings database 247 may store data related to various devices that have been set up to communicate with television receiver 200. For instance, settings database 247 may be configured to store information on which types of events should be indicated to users, to which users, in what order, and what communication methods should be used. For instance, an event such as an open garage may only be notified to certain wireless devices, e.g., a cellular phone associated with a parent, not a child, notification may be by a third-party notification server, email, text message, and/or phone call. In some embodiments, a second notification method may only be used if a first fails. For instance, if a notification cannot be sent to the user via a third-party notification server, an email may be sent.

Settings database 247 may store information that allows for the configuration and control of individual devices which may operate using Z-wave and Zigbee-specific protocols. To do so, home automation engine 211 may create a proxy for each device that allows for settings for the device to be passed through a UI, e.g. presented on a television, to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate device and/or used for managing the appropriate device. For example, a piece of exercise equipment that is enabled to interface with the home automation engine 211, such as via device interface 221, may be configured at the electronic device 211 in addition to on the piece of exercise equipment itself. Additionally, a mobile device or application residing on a mobile device and utilized with exercise equipment may be configured in such a fashion as well for displaying received fitness information on a coupled display device.

Script database 248 (e.g., home automation script database) may store scripts that detail how devices are to function based on various events occurring. For instance, if stored content starts being played back by television receiver 200, lights in the vicinity of display device 160 may be dimmed and shades may be lowered by communicatively coupled and controlled shade controller. As another example, when a user shuts programming off late in the evening, there may be an assumption the user is going to bed. Therefore, the user may configure television receiver 200 to lock all doors via a lock controller, shut the garage door via garage controller, lower a heat setting of thermostat, shut off all lights via a light controller, and determine if any windows or doors are open via window sensors and door sensors, and, if so, alert the user. Such scripts or programs may be predefined by the home automation/television service provider and/or may be defined by a user.

In some embodiments, script database 248 may allow for various music profiles to be implemented. For instance, based on settings within a structure, appropriate music may be played. For instance, when a piece of exercise equipment is connected or is used, energizing music may be played. Conversely, based on the music being played, settings of connected devices may be determined. If television programming, such as a movie, is output for playback by television receiver 150, a particular script may be used to adjust connected device settings, e.g., lower lights, raise temperature, and lock doors.

EPG database 230 may store information related to television channels and the timing of programs appearing on such television channels. EPG database 230 may be stored using storage medium 225, which may be a hard drive or solid-state drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220, via satellite, or some other communication link with a television service provider, e.g., a cable network. Updates to EPG database 230 may be received periodically. EPG database 230 may serve as an interface for a user to control DVR functions of television receiver 200, and/or to enable viewing and/or recording of multiple television channels simultaneously. EPG database 240 may also contain information about on-demand content or any other form of accessible content.

Decoder module 233 may serve to convert encoded video and audio into a format suitable for output to a display device. For instance, decoder module 233 may receive MPEG video and audio from storage medium 225 or descrambling engine 265 to be output to a television. MPEG video and audio from storage medium 225 may have been recorded to DVR database 245 as part of a previously-recorded television program. Decoder module 233 may convert the MPEG video and audio into a format appropriate to be displayed by a television or other form of display device and audio into a format appropriate to be output from speakers, respectively. Decoder module 233 may have the ability to convert a finite number of television channel streams received from storage medium 225 or descrambling engine 265, simultaneously. For instance, decoders within decoder module 233 may be able to only decode a single television channel at a time. Decoder module 233 may have various numbers of decoders.

Television interface 235 may serve to output a signal to a television or another form of display device in a proper format for display of video and playback of audio. As such, television interface 235 may output one or more television channels, stored television programming from storage medium 225, e.g., television programs from DVR database 245, television programs from on-demand programming 230 and/or information from EPG database 230, to a television for presentation. Television interface 235 may also serve to output a CVM.

Digital Video Recorder (DVR) functionality may permit a television channel to be recorded for a period of time. DVR functionality of television receiver 200 may be managed by control processor 210a. Control processor 210a may coordinate the television channel, start time, and stop time of when recording of a television channel is to occur. DVR database 245 may store information related to the recording of television channels. DVR database 245 may store timers that are used by control processor 210a to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created; one for each television channel. Within each file, one or more television programs may be present. The service provider may define the television channels, the dates, and the time periods for which the television channels are recorded for the provider-defined timers. The provider-defined timers may be transmitted to television receiver 200 via the television provider's network. For example, in a satellite-based television service provider system, data necessary to create the provider-defined timers at television receiver 150 may be received via satellite.

On-demand programming database 227 may store additional television programming. On-demand programming database 227 may include television programming that was not recorded to storage medium 225 via a timer, either user- or provider-defined. Rather, on-demand programming may be programming provided to the television receiver directly for storage by the television receiver and for later presentation to one or more users. On-demand programming may not be user-selected. As such, the television programming stored to on-demand programming database 227 may be the same for each television receiver of a television service provider. On-demand programming database 227 may include pay-per-view (PPV) programming that a user must pay and/or use an amount of credits to view. For instance, on-demand programming database 227 may include movies that are not available for purchase or rental yet.

Referring back to tuners 215, television channels received via satellite or cable may contain at least some scrambled data. Packets of audio and video may be scrambled to prevent unauthorized users, e.g., nonsubscribers, from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which can be determined to be associated with a particular television channel. Particular data packets, referred to as entitlement control messages (ECMs), may be periodically transmitted. ECMs may be associated with another PID and may be encrypted; television receiver 200 may use decryption engine 261 of security device 260 to decrypt ECMs. Decryption of an ECM may only be possible if the user has authorization to access the particular television channel associated with the ECM. When an ECM is determined to correspond to a television channel being stored and/or displayed, the ECM may be provided to security device 260 for decryption.

When security device 260 receives an encrypted ECM, security device 260 may decrypt the ECM to obtain some number of control words. In some embodiments, from each ECM received by security device 260, two control words are obtained. In some embodiments, when security device 260 receives an ECM, it compares the ECM to the previously received ECM. If the two ECMs match, the second ECM is not decrypted because the same control words would be obtained. In other embodiments, each ECM received by security device 260 is decrypted; however, if a second ECM matches a first ECM, the outputted control words will match; thus, effectively, the second ECM does not affect the control words output by security device 260. Security device 260 may be permanently part of television receiver 200 or may be configured to be inserted and removed from television receiver 200, such as a smart card, cable card, or the like.

Tuning management processor 210b may be in communication with tuners 215 and control processor 210a. Tuning management processor 210b may be configured to receive commands from control processor 210a. Such commands may indicate when to start/stop receiving and/or recording of a television channel and/or when to start/stop causing a television channel to be output to a television. Tuning management processor 210b may control tuners 215. Tuning management processor 210b may provide commands to tuners 215 that instruct the tuners which satellite, transponder, and/or frequency to tune to. From tuners 215, tuning management processor 210b may receive transponder streams of packetized data.

Descrambling engine 265 may use the control words output by security device 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by security device 260 to be used for successful descrambling may be indicated by a scramble control identifier present within the data packet containing the scrambled video or audio. Descrambled video and/or audio may be output by descrambling engine 265 to storage medium 225 for storage, in DVR database 245, and/or to decoder module 233 for output to a television or other presentation equipment via television interface 235.

In some embodiments, the television receiver 200 may be configured to periodically reboot in order to install software updates downloaded over the network 190 or satellites 130. Such reboots may occur for example during the night when the users are likely asleep and not watching television. If the system utilizes a single processing module to provide television receiving and home automation functionality, then the security functions may be temporarily deactivated. In order to increase the security of the system, the television receiver 200 may be configured to reboot at random times during the night in order to allow for installation of updates. Thus, an intruder is less likely to guess the time when the system is rebooting. In some embodiments, the television receiver 200 may include multiple processing modules for providing different functionality, such as television receiving functionality and home automation, such that an update to one module does not necessitate reboot of the whole system. In other embodiments, multiple processing modules may be made available as a primary and a backup during any installation or update procedures.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Television receiver 200 may include one or more instances of various computerized components, such as disclosed in relation to computer system 1100 of FIG. 11.

While the television receiver 200 has been illustrated as a satellite-based television receiver, it is to be appreciated that techniques below may be implemented in other types of television receiving devices, such a cable receivers, terrestrial receivers, IPTV receivers or the like. In some embodiments, the television receiver 200 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 200 may be performed by an overlay device. If such an overlay device is used, television programming functions may still be provided by a television receiver that is not used to provide home automation functions.

Figure 3:
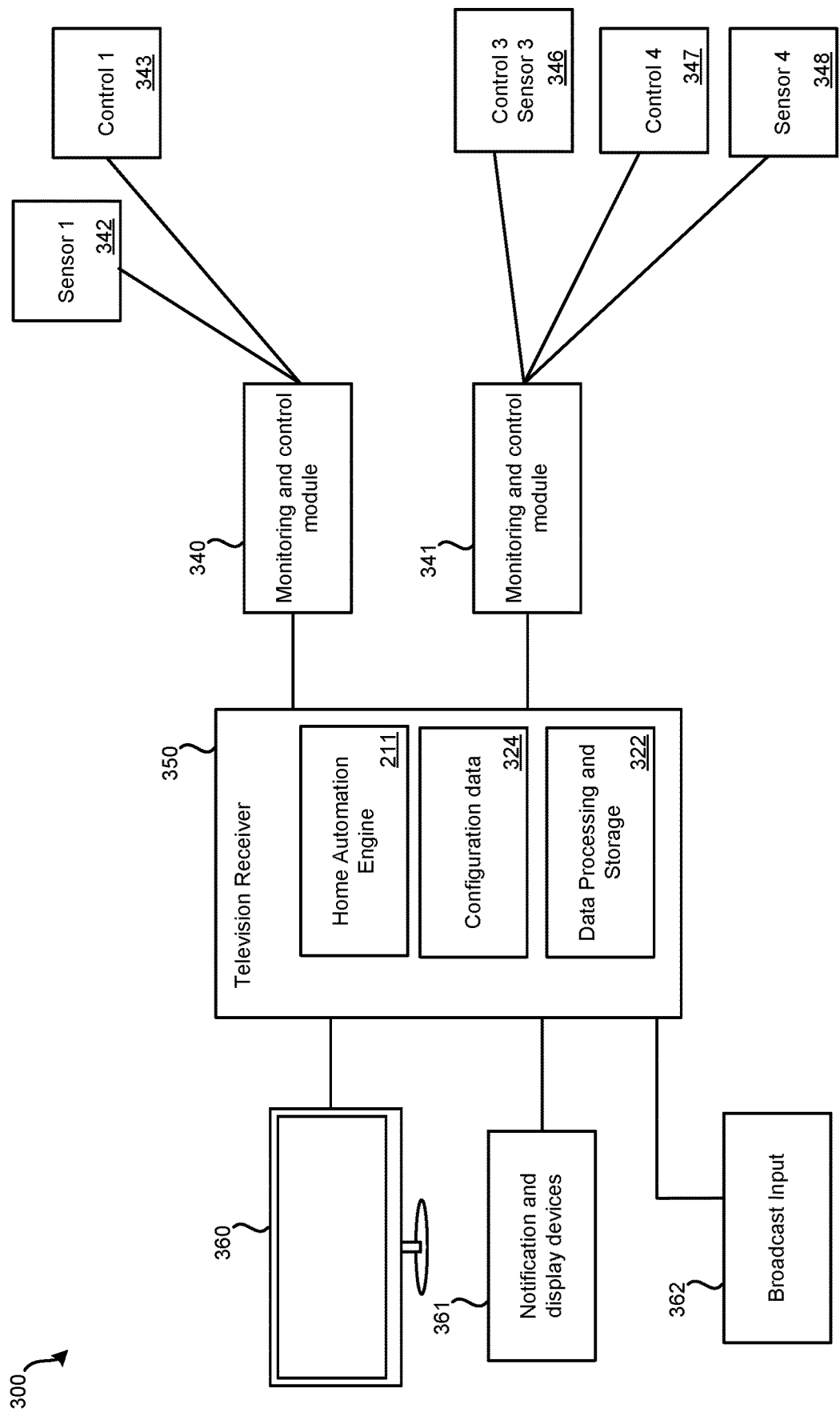
FIG. 3 illustrates an example television system setup that may be used in accordance with embodiments of the present technology.

FIG. 3 shows an embodiment of a system for home monitoring and control that includes a television receiver 350 that may be used in accordance with embodiments of the present technology. The system 300 may include a television receiver that is directly or indirectly coupled to one or more display devices 360 such as a television or a monitor. The television receiver may be communicatively coupled to other display and notification devices 361 such as stereo systems, speakers, lights, mobile phones, tablets, and the like. The television receiver may be configured to receive readings from one or more sensors 342, 348, or sensor systems 346 and may be configured to provide signals for controlling one or more control units 343, 347 or control systems 346.

In embodiments the television receiver may include a monitoring and control module 340, 341 and may be directly or indirectly connected or coupled to one or more sensors and/or control units. Sensors and control units may be wired or wirelessly coupled with the television receiver. The sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

The system may include one or more monitoring and control modules 340, 341 that are external to the television receiver 350. The television receiver may interface to sensors and control units via one or more of the monitoring and control modules. The external monitoring and control modules 340, 341 may be wired or wirelessly coupled with the television receiver. In some embodiments, the monitoring and control modules may connect to the television receiver via a communication port such as a USB port, serial port, and/or the like, or may connect to the television receiver via a wireless communication protocol such as Wi-Fi, Bluetooth, Z-Wave, ZigBee, and the like. The external monitoring and control modules may be a separate device that may be positioned near the television receiver or may be in a different location, remote from the television receiver.

In embodiments, the monitoring and control modules 340, 341 may provide protocol, communication, and interface support for each sensor and/or control unit of the system. The monitoring and control module may receive and transmit readings and provide a low level interface for controlling and/or monitoring the sensors and/or control units. The readings processed by the monitoring and control modules 340, 341 may be used by the other elements of the television receiver. For example, in some embodiments the readings from the monitoring and control modules may be logged and analyzed by the data processing and storage 322 module. The data processing and storage 322 module may analyze the received data and generate control signals, schedules, and/or sequences for controlling the control units. Additionally, the data processing and storage module 322 may utilize input data to generate additional outputs. For example, the module 322 may receive from a sensor 342 information from a communicatively coupled piece of equipment. The sensor may be a part of or attached to the equipment in various embodiments. The equipment may provide information regarding movements, alarms, or notifications associated with the home, and the data processing module 322 may use this data to generate relative distance information to be output to and displayed by display device 360. In some embodiments, the monitoring and control modules 340, 341 may be configured to receive and/or send digital signals and commands to the sensors and control units. The monitoring and control modules may be configured to receive and/or send analog signals and commands to the sensors and control units.

Sensors and control units may be wired or wirelessly coupled to the monitoring and control modules 340, 341 or directly or indirectly coupled with the receiver 350 itself. The sensors and control units may be coupled and connected in a serial, parallel, star, hierarchical, and/or the like topologies and may communicate to the monitoring and control modules via one or more serial, bus, or wireless protocols and technologies. The sensors may include any number of temperature, humidity, sound, proximity, field, electromagnetic, magnetic sensors, cameras, infrared detectors, motion sensors, pressure sensors, smoke sensors, fire sensors, water sensors, and/or the like. The sensors may also be part of or attached to other pieces of equipment, such as exercise equipment, doors or windows, or home appliances, or may be applications or other sensors as part of mobile devices.

The monitoring and control modules 340, 341 may be coupled with one or more control units. The control units may include any number of switches, solenoids, solid state devices and/or the like for making noise, turning on/off electronics, heating and cooling elements, controlling appliances, HVAC systems, lights, and/or the like. For example, a control unit may be a device that plugs into an electrical outlet of a home. Other devices, such as an appliance, may be plugged into the device. The device may be controlled remotely to enable or disable electricity to flow to the appliance. A control unit may also be part of an appliance, heating or cooling system, and/or other electric or electronic devices. In embodiments the control units of other system may be controlled via a communication or control interface of the system. For example, the water heater temperature setting may be configurable and/or controlled via a communication interface of the water heater or home furnace. Additionally, received telephone calls may be answered or pushed to voicemail in embodiments.

The controllers, e.g., controller 343, may include a remote control designed for association with the television receiver. For example, the receiver remote control device may be communicatively coupled with the television receiver, such as through interface 250, or one or more of the monitoring and control modules for providing control or instruction for operation of the various devices of the system. The control may be utilized to provide instructions to the receiver for providing various functions with the automation system including suspending alert notifications during an event. For example, a user may determine prior to or during an event that he wishes to suspend one or more types of notifications until the event has ended, and may so instruct the system with the controller.

Sensors may be part of other devices and/or systems. For example, sensors may be part of a mobile device such as a phone. The telemetry readings of the sensors may be accessed through a wireless communication interface such as a Bluetooth connection from the phone. As another example, temperature sensors may be part of a heating and ventilation system of a home. The readings of the sensors may be accessed via a communication interface of the heating and ventilation system. Sensors and/or control units may be combined into assemblies or units with multiple sensing capabilities and/or control capabilities. A single module may include, for example a temperature sensor and humidity sensor. Another module may include a light sensor and power or control unit and so on.

In embodiments, the sensors and control units may be configurable or adjustable. In some cases the sensors and control units may be configurable or adjustable for specific applications. The sensors and control units may be adjustable by mechanical or manual means. In some cases the sensors and control units may be electronically adjustable from commands or instructions sent to the sensors or control units. For example, the focal length of a camera may be configurable in some embodiments. The focal length of a camera may be dependent on the application of the camera. In some embodiments the focal length may be manually set or adjusted by moving or rotating a lens. In some embodiments the focal length may be adjusted via commands that cause an actuator to move one or more lenses to change the focal length. In other embodiments, the sensitivity, response, position, spectrum and/or like of the sensors may be adjustable.

During operation of the system 300, readings from the sensors may be collected, stored, and/or analyzed in the television receiver 350. In embodiments, analysis of the sensors and control of the control units may be determined by configuration data 324 stored in the television receiver 350. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time based analysis to determine trends, such as temperature fluctuations in a typical day or energy usage. Such trending information may be developed by the receiver into charts or graphs for display to the user. For other applications, sensor analysis may include monitoring sensor readings to determine if a threshold value of one or more sensors has been reached.

The function of the system may be determined by loading and/or identifying configuration data for an application. In embodiments, the system 300 may be configured for more than one monitoring or control operation by selecting or loading the appropriate configuration data. In some embodiments the same sensors and/or control units may be used for multiple applications depending on the configuration data used to process and analyze sensor readings and/or activate the control units. Multiple monitoring and/or control applications may be active simultaneously or in a time multiplexed manner using the same or similar set of sensors and/or control units.

For example, the system 300 may be configured for both exercise monitoring and temperature monitoring applications using the same set of sensors. In embodiments, both monitoring applications may be active simultaneously or in a time multiplexed manner depending on which configuration data is loaded. In both monitoring applications the same sensors, such as proximity sensors, or cameras may be used. Using the same sensors, the system may be configured for space temperature monitoring. For temperature monitoring, the system may only monitor a specific subset of the sensors for activity. For temperature monitoring, sensor activity may not need to be saved or recorded. The sensor readings may be monitored for specific thresholds which may indicate a threshold temperature for adjusting the space temperature. In this example, the two different monitoring examples may be selected based on the active configuration data. When one configuration data is active, data from the sensors may be saved and analyzed. When the second configuration data is active, the system may monitor sensor readings for specific thresholds. Of course, multiple or alternative sensors may be used as well.

In embodiments the results, status, analysis, and configuration data details for each application may be communicated to a user. In embodiments auditory, visual, and tactile communication methods may be used. In some cases a display device such as a television may be used for display and audio purposes. The display device may show information related to the monitoring and control application. Statistics, status, configuration data, and other elements may be shown. Users may also save particular configuration data for devices, such as notification suspensions while the user is using the coupled display. A user may log in or be recognized by the system upon activation and the system may make adjustments based on predetermined or recorded configuration data. For example, a user may have instructed that when he is recognized by the system, either automatically or with provided login information, a notification suspension profile personal to the user be enacted. That profile may include that the user would like to continue to receive alarms, such as smoke, fire, or hazard alarms, but that received telephone call information is suspended. The user may access the profile and select to begin, the user may be recognized by the system, or a combination such as being recognized by the system such that the television operations are performed or are input by a remote control, while the user himself selects a particular activity to perform with the system.

Any number of additional adjustments or operations may be performed as well, as would be understood as encompassed by the present technology. For example, the space temperature may be monitored or adjusted as well. In one situation, after the user has been exercising for a period of time, generated heat may raise the space temperature above a threshold such that the home automation engine 211 additionally begins operation or adjustment of the HVAC system to cool the space. Additionally, configuration data for the user may include reducing the space temperature to a particular degree based on a preference of the user. Thus, when the user loads a profile or begins exercising, the home automation system may automatically begin adjusting the space temperature as well in anticipation of heat generation or user preferences.

In embodiments the system may include additional notification and display devices 361 capable of notifying the user, showing the status, configuration data, and/or the like. The additional notification and display devices may be devices that are directly or indirectly connected with the television receiver. In some embodiments computers, mobile devices, phones, tablets, and the like may receive information, notifications, control signals, etc., from the television receiver. Data related to the monitoring and control applications and activity may be transmitted to remote devices and displayed to a user. Such display devices may be used for presenting to the user interfaces that may be used to further configure or change configuration data for each application. An interface may include one or more options, selection tools, navigation tools for modifying the configuration data which in turn may change monitoring and/or control activity of an application. Modification to a configuration may be used to adjust general parameters of a monitoring application to specific constraints or characteristics of a home, user's schedule, control units, and/or the like.

Display interfaces may be used to select and/or download new configurations for monitoring and/or control applications. A catalog of pre-defined configuration data definitions for monitoring and control applications may be available to a user. A user may select, load, and/or install the applications on the television receiver by making a selection using in part the display device. For example, a user may load a profile based on notification suspension preferences as discussed above. In embodiments, configuration data may be a separate executable application, code, package, and/or the like. In some cases, the configuration data may be a set of parameters that define computations, schedules, or options for other processor executable code or instructions. Configuration data may be a meta data, text data, binary file, and/or the like.

In embodiments notification and display devices may be configured to receive periodic, scheduled, or continuous updates for one or more monitoring and control applications. The notifications may be configured to generate pop-up screens, notification banners, sounds, and/or other visual, auditory, and/or tactile alerts. In the case where the display device is a television, some notifications may be configured to cause a pop-up or banner to appear over the programming or content being displayed, such as when a proximity monitor has been triggered in the home. Such an alert may be presented in a centrally located box or in a position different from the fitness information to make it more recognizable. Additionally the program being watched can be paused automatically while such an alert is being presented, and may not be resumed unless receiving an input or acceptance from the user. Some notifications may be configured to cause the television to turn on if it is powered off or in stand-by mode and display relevant information for a user. In this way, users can be warned of activity occurring elsewhere in the system.

The television receiver may also be configured to receive broadcast or other input 362. Such input may include television channels or other information previously described that is used in conjunction with the monitoring system to produce customizable outputs. For example, a user may wish to watch a particular television channel while also receiving video information of activities occurring on the property. The television receiver may receive both the exterior camera information and television channel information to develop a modified output for display. The display may include a split screen in some way, a banner, an overlay, etc.

Figure 4:
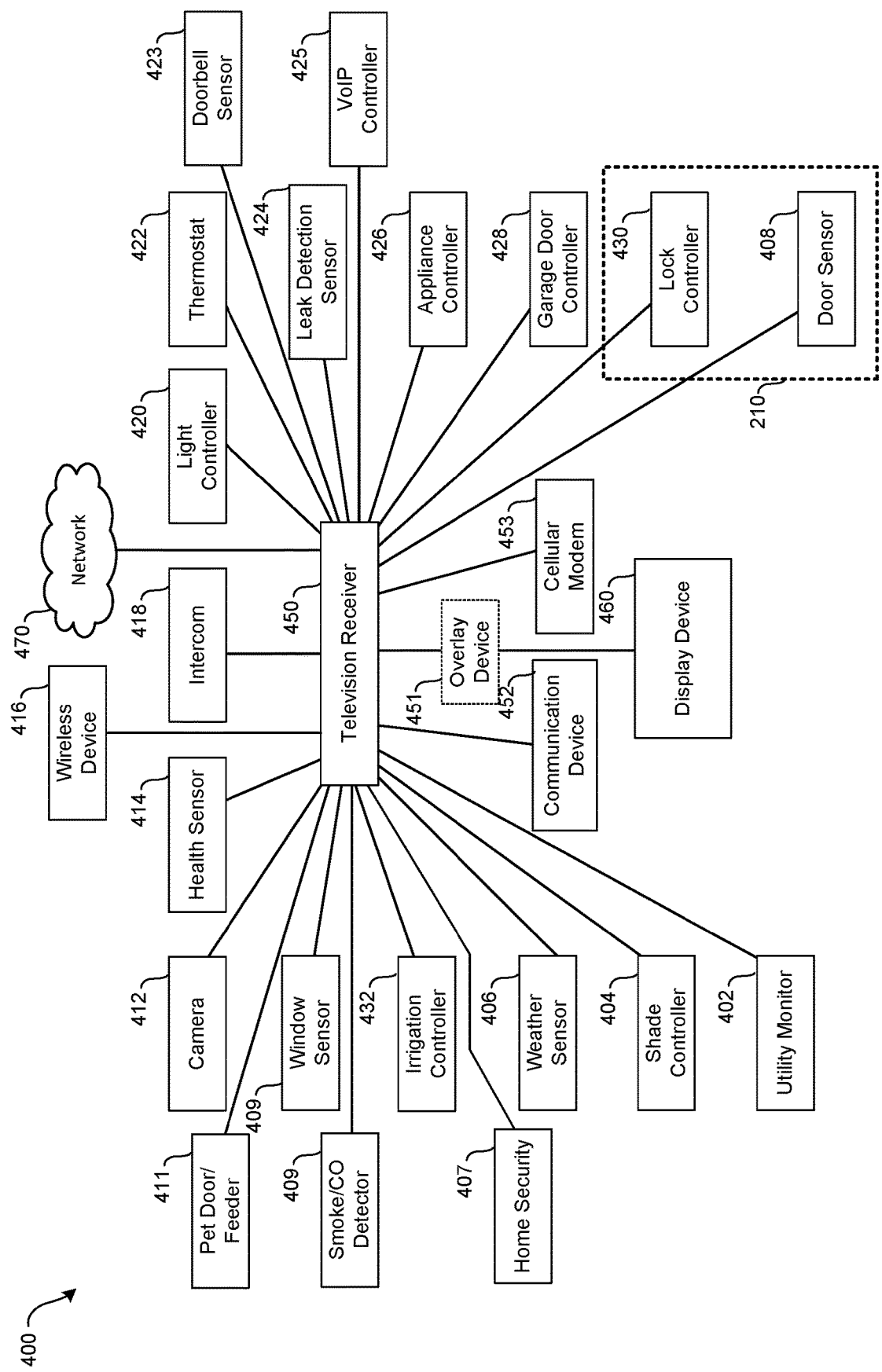
FIG. 4 illustrates an embodiment of a television system that may be used in accordance with embodiments of the present technology.

FIG. 4 illustrates an embodiment of a television and connected device system 400 hosted by a television receiver that may be used in accordance with embodiments of the present technology. Television receiver 450 may be configured to receive television programming from a satellite-based television service provider; in other embodiments other forms of television service provider networks may be used, such as an IP-based network (e.g., fiber network), a cable based network, a wireless broadcast-based network, etc.

Television receiver 450 may be configured to communicate with multiple in-home connected (e.g., home automation) devices. The devices with which television receiver 450 communicates may use different communication standards. For instance, one or more devices may use a ZigBee® communication protocol while one or more other devices communicate with the television receiver using a Z-Wave® communication protocol. Other forms of wireless communication may be used by devices and the television receiver. For instance, television receiver 450 and one or more devices may be configured to communicate using a wireless local area network, which may use a communication protocol such as IEEE 802.11.

In some embodiments, a separate device may be connected with television receiver 450 to enable communication with home automation devices. For instance, communication device 452 may be attached to television receiver 450. Communication device 452 may be in the form of a dongle. Communication device 452 may be configured to allow for Zigbee®, Z-Wave®, and/or other forms of wireless communication. The communication device may connect with television receiver 450 via a USB port or via some other type of (wired) communication port. Communication device 452 may be powered by the television receiver or may be separately coupled with a power source. In some embodiments, television receiver 450 may be enabled to communicate with a local wireless network and may use communication device 452 in order to communicate with devices that use a ZigBee® communication protocol, Z-Wave® communication protocol, and/or some other home wireless communication protocols.

Communication device 452 may also serve to allow additional components to be connected with television receiver 450. For instance, communication device 452 may include additional audio/video inputs (e.g., HDMI), a component, and/or a composite input to allow for additional devices (e.g., Blu-ray players) to be connected with television receiver 450. Such connection may allow video from such additional devices to be overlaid with home automation information. Whether home automation information is overlaid onto video may be triggered based on a user's press of a remote control button.

Regardless of whether television receiver 450 uses communication device 452 to communicate with home automation devices, television receiver 450 may be configured to output home automation information for presentation to a user via display device 460, which may be a television, monitor, or other form of device capable of presenting visual information. Such information may be presented simultaneously with television programming received by television receiver 450. Television receiver 450 may also, at a given time, output only television programming or only home automation information based on a user's preference. The user may be able to provide input to television receiver 450 to control the home automation system hosted by television receiver 450 or by overlay device 451, as detailed below.

In some embodiments, television receiver 450 may not be used as a host for a home automation system. Rather, a separate device may be coupled with television receiver 450 that allows for home automation information to be presented to a user via display device 460. This separate device may be coupled with television receiver 450. In some embodiments, the separate device is referred to as overlay device 451. Overlay device 451 may be configured to overlay information, such as home automation information, onto a signal to be visually presented via display device 460, such as a television. In some embodiments, overlay device 451 may be coupled between television receiver 450, which may be in the form of a set top box, and display device 460, which may be a television. In such embodiments, television receiver 450 may receive, decode, descramble, decrypt, store, and/or output television programming. Television receiver 450 may output a signal, such as in the form of an HDMI signal. Rather than be directly input to display device 460, the output of television receiver 450 may be input to overlay device 451. Overlay device 451 may receive the video and/or audio output from television receiver 450. Overlay device 451 may add additional information to the video and/or audio signal received from television receiver 450. The modified video and/or audio signal may be output to display device 460 for presentation. In some embodiments, overlay device 451 has an HDMI input and an HDMI output, with the HDMI output being connected to display device 460. To be clear, while FIG. 4 illustrates lines illustrating communication between television receiver 450 and various devices, it should be understood that such communication may exist, in addition or alternatively via communication device 452 and/or with overlay device 451.

In some embodiments, television receiver 450 may be used to provide home automation functionality but overlay device 451 may be used to present information via display device 460. It should be understood that the home automation functionality detailed herein in relation to a television receiver may alternatively be provided via overlay device 451. In some embodiments, overlay device 451 may provide home automation functionality and be used to present information via display device 460. Using overlay device 451 to present automation information via display device 460 may have additional benefits. For instance, multiple devices may provide input video to overlay device 451. For instance, television receiver 450 may provide television programming to overlay device 451, a DVD/Blu-Ray player may provide video overlay device 451, and a separate internet-TV device may stream other programming to overlay device 451. Regardless of the source of the video/audio, overlay device 451 may output video and/or audio that has been modified to include home automation information and output to display device 460. As such, in such embodiments, regardless of the source of video/audio, overlay device 451 may modify the audio/video to include home automation information and, possibly, solicit for user input. For instance, in some embodiments, overlay device 451 may have four video inputs (e.g., four HDMI inputs) and a single video output (e.g., an HDMI output). In other embodiments, such overlay functionality may be part of television receiver 450. As such, a separate device, such as a Blu-ray player, may be connected with a video input of television receiver 450, thus allowing television receiver 450 to overlay home automation information when content from the Blu-Ray player is being output to display device 460.

Regardless of whether television receiver 450 is itself configured to provide home automation functionality and output home automation input for display via display device 460 or such home automation functionality is provided via overlay device 451, home automation information may be presented by display device 460 while television programming is also being presented by display device 460. For instance, home automation information may be overlaid or may replace a portion of television programming (e.g., broadcast content, stored content, on-demand content, etc.) presented via display device 460.

Television receiver 450 or overlay device 451 may be configured to communicate with one or more wireless devices, such as wireless device 416. Wireless device 416 may represent a tablet computer, cellular phone, laptop computer, remote computer, or some other device through which a user may desire to control home automation settings and view home automation information. Such a device also need not be wireless, such as a desktop computer. Television receiver 450, communication device 452, or overlay device 451 may communicate directly with wireless device 416, or may use a local wireless network, such as network 470. Wireless device 416 may be remotely located and not connected with a same local wireless network. Via the internet, television receiver 450 or overlay device 451 may be configured to transmit a notification to wireless device 416 regarding home automation information. For instance, in some embodiments, a third-party notification server system, such as the notification server system operated by Apple®, may be used to send such notifications to wireless device 416.

In some embodiments, a location of wireless device 416 may be monitored. For instance, if wireless device 416 is a cellular phone, when its position indicates it has neared a door, the door may be unlocked. A user may be able to define which home automation functions are controlled based on a position of wireless device 416. Other functions could include opening and/or closing a garage door, adjusting temperature settings, turning on and/or off lights, opening and/or closing shades, etc. Such location-based control may also take into account the detection of motion via one or more motion sensors that are integrated into other home automation devices and/or stand-alone motion sensors in communication with television receiver 450.

In some embodiments, little to no setup of network 470 may be necessary to permit television receiver 450 to stream data out to the Internet. For instance, television receiver 450 and network 470 may be configured, via a service such as Sling® or other video streaming service, to allow for video to be streamed from television receiver 450 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Wireless device 416 may serve as an input device for television receiver 450. For instance, wireless device 416 may be a tablet computer that allows text to be typed by a user and provided to television receiver 450. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While wireless device 416 may be used as the input device for typing text, television receiver 450 may output for display text to display device 460.

In some embodiments, a cellular modem 453 may be connected with either overlay device 451 or television receiver 450. Cellular modem 453 may be useful if a local wireless network is not available. For instance, cellular modem 453 may permit access to the internet and/or communication with a television service provider. Communication with a television service provider may also occur via a local wireless or wired network connected with the Internet. In some embodiments, information for home automation purposes may be transmitted by a television service provider system to television receiver 450 or overlay device 451 via the television service provider's distribution network, which may include the use of satellites 730, as detailed in relation to FIG. 7.

Various home automation devices may be in communication with television receiver 450 or overlay device 451. Such home automation devices may use disparate communication protocols. Such home automation devices may communicate with television receiver 450 directly or via communication device 452. Such home automation devices may be controlled by a user and/or have a status viewed by a user via display device 460 and/or wireless device 416. Home automation devices may include: smoke/carbon monoxide detector, home security system 407, pet door/feeder 411, camera 412, window sensor 409, irrigation controller 432, weather sensor 406, shade controller 404, utility monitor 402, heath sensor 414, intercom 418, light controller 420, thermostat 422, leak detection sensor 424, appliance controller 426, garage door controller 428, doorbell sensor 423, and VoIP controller 425.

Door sensor 408 and lock controller 430 may be incorporated into a single device, such as door lock and sensor unit 210, and may allow for a door's position (e.g., open or closed) to be determined and for a lock's state to be determined and changed. Door sensor 408 may transmit data to television receiver 450 (possibly via communication device 452) or overlay device 251 that indicates the status of a window or door, respectively. Such status may indicate open or closed. When a status change occurs, the user may be notified as such via wireless device 416 or display device 460. Further, a user may be able to view a status screen to view the status of one or more door sensors throughout the location. Window sensor 409 and/or door sensor 408 may have integrated glass break sensors to determine if glass has been broken. Lock controller 430 may permit a door to be locked and unlocked and/or monitored by a user via television receiver 450 or overlay device 451. No mechanical or electrical component may need to be integrated separately into a door or door frame to provide such functionality. Such a single device may have a single power source that allows for sensing of the lock position, sensing of the door position, and for engagement and disengagement of the lock.

Additional forms of sensors not illustrated in FIG. 2 may also be incorporated as part of a home automation system. For instance, a mailbox sensor may be attached to a mailbox to determine when mail is present and/or has been picked up.

The ability to control one or more showers, baths, and/or faucets from television receiver 450 and/or wireless device 416 may also be possible. Pool and/or hot tub monitors may be incorporated into a home automation system. Such sensors may detect whether or not a pump is running, water temperature, pH level, a splash/whether something has fallen in, etc. Further, various characteristics of the pool and/or hot tub may be controlled via the home automation system. In some embodiments, a vehicle dashcam may upload or otherwise make video/audio available to television receiver 450 when within range. For instance, when a vehicle has been parked within range of a local wireless network with which television receiver 450 is connected, video and/or audio may be transmitted from the dashcam to the television receiver for storage and/or uploading to a remote server.

To be clear, the home automation functions detailed herein that are attributed to television receiver 450 may alternatively or additionally be incorporated into overlay device 451 or some separate computerized home automation host system.

Figure 5:
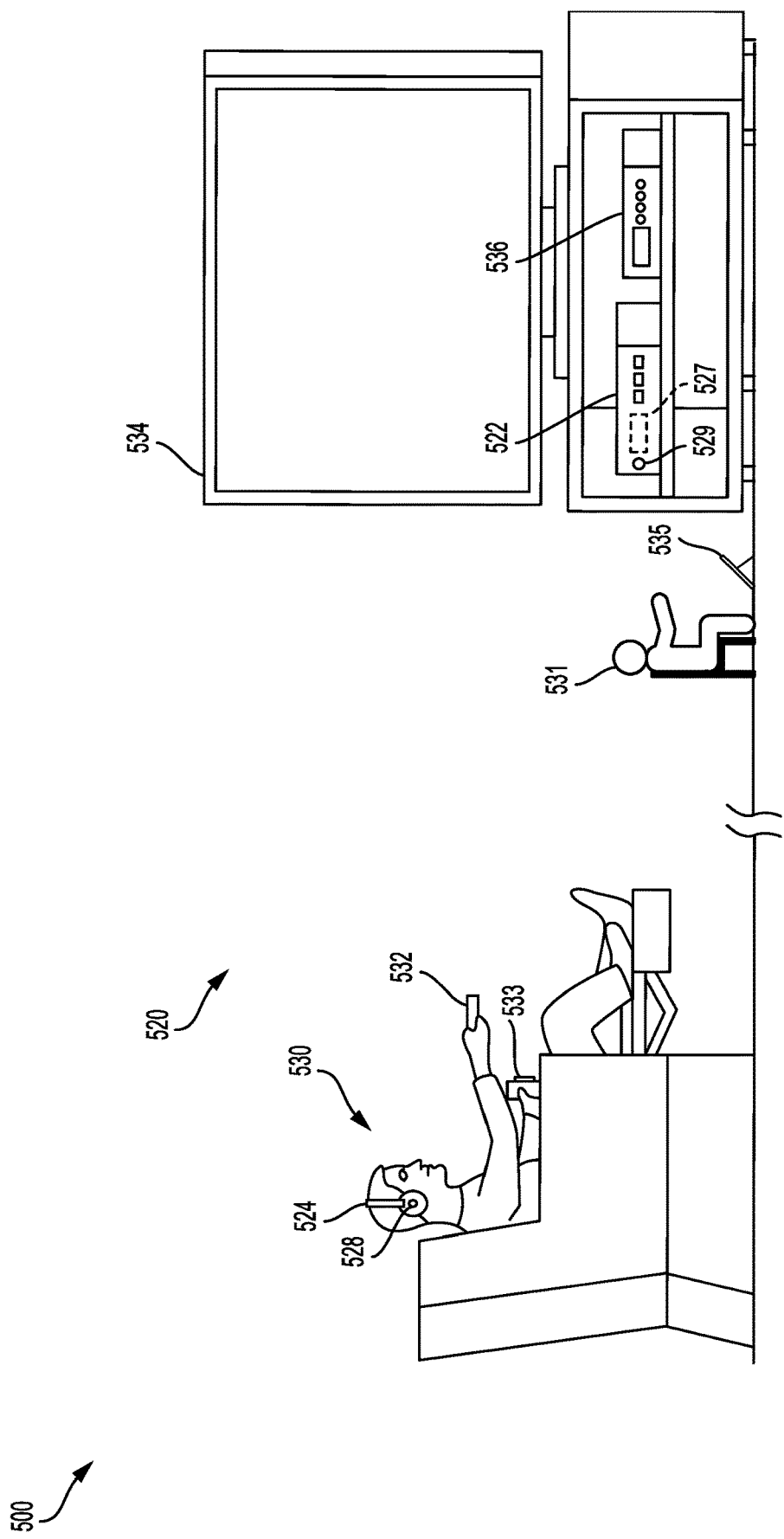
FIG. 5 illustrates an environment including a residential setting with a media presentation system that may be used in accordance with embodiments of the present technology.

FIG. 5 illustrates an environment 500 including a residential setting with a media presentation system 520 that may be used in accordance with embodiments of the present technology. The media presentation system 520 includes a television receiver 522, a wireless headset 524 worn by a user with embodiments of the present technology user 530, a remote control 532 held by the user 530, a television 534 communicatively coupled to the television receiver 522, and an electronic media device 536 communicatively coupled to the television receiver 522 and/or the television 534. The wireless headset 524 may include a transceiver and a sensor 528. The television receiver 522 may include a transceiver 527 and a sensor 529.

In one embodiment, the television receiver 522 receives media content from a satellite television service provider, cable television provider, the Internet, terrestrial broadcast signals, etc. The television receiver 522 displays media programs on the television 534. The user 530 can operate a remote control 532 to control the television receiver 522. The user 530 can select media programs to be displayed on a television 534 by the television receiver 522. More specifically, by using the remote control 532, the user 530 can access menu screens of the television receiver 522. In the menu screens, the user can select a particular media program. For example, the user may wish to watch Sports Center at 10 PM on ESPN. The audio portion of the media programs may be transmitted or from the transceiver 527 through the air for the user 530 to hear or to the wireless headset 524.

In one embodiment, the sensor 529 of the television receiver 522 or sensor 528 of the wireless headset 524 monitors a physical state of the user such as head motion, head orientation, pulse, breathing rate, etc., characteristics of the user such as the user's sex, hair color, height, approximate age, clothing, etc., and characteristics of the environment or objects in the environment. The media device 536 can be a game console, a DVD player, stereo system or other electronic media devices that may, for example, include one or more sensors, which may perform similar monitoring. The sensors included in media presentation system 520, whether in the television receiver 522, media device 536, or otherwise, may generate/collect data associated with the environment and/or user(s) in the environments, such as data associated with the monitored characteristics. This data may be used to identify which people are users of the media presentation system (e.g., television receiver) to, for example, generate a list of those users. In another embodiment, the identity of the users themselves may be received via an input from a user or from a related television content provider that has information about a subscriber/user of their services associated with the media presentation system. In another embodiment, this data may be used to determine when one or more of the users are present in the environment so that programming, advertisements, and other content may be tailored or targeted to those one or more users using, for example, television 534. In another embodiment, this data may be used to determine characteristics about the one or more users to determine specifically which programming, advertisements, and other content may be tailored or targeted to those one or more users. For example, sensors associated with media presentation system 520 may use collected data to determine that user 530 (i.e., "user one") is a male adult who watches sports regularly and that user 531 (i.e., "user two") is a female child who watches cartoons regularly. The collected data in addition to the data determined from analyzing the collected data may allow the system to make other determinations about the users, and customize aspects of the media presentation system 520 (e.g., television content and/or advertisements) to the users based on their likes, dislikes, and other associated data.

As noted, data may be used to determine when one or more of the users are present in the environment. Other methods may be used to determine when a user is present in the environment. For example, a user's personal (e.g., mobile) device may be used to determine when a user is present, for example based on when the device is present. For example, mobile device 533 may be near user 530, and mobile device 535 may be near user 531. Even if the users are not carrying their respective mobile devices on their person, the mobile devices may at least be in the same room (e.g., on the table or couch) as them. Since people tend to carry one or more mobile devices on or near their person on a regular basis, the presence of a mobile device owned by the person may be an indication that the person is present as well. In some instances, such a mobile device may be easier to detect as present in the environment than the user of that mobile device, based on what sensors are available to detect that presence. For example, a sensor (e.g., sensor 529) may already previously have been set up to communicate with a mobile device of the user, such as mobile device 533 or mobile device 535. In another embodiment, a sensor may detect one or more signals or communications being transmitted from or transmitted to a mobile device.

The presence of a mobile device may be detected using a variety of different methods. For example, the location of a mobile device may be detected using the device's GPS coordinates (e.g., if the system can communicate with the device so as to be able to collect GPS data from the device). In another embodiment, the location of a mobile device may be detected using signal triangulation, based on subscriber information associated with the device or television service provider, connection of the mobile device with a Wi-Fi network in the environment or with other devices in the environment, proximity detection using the television receiver, among other methods. After a mobile device is detected, the mobile device may be added to a list of detected mobile devices that are present in the environment. A person, such as a user, may be associated with a particular mobile device using predetermined inputs from that or another user, based on associated MAC addresses from each mobile device (e.g., to determine if the device is connected to a local network in the environment), among other methods.

One example customization may be to customize advertisements (e.g., television commercials) that a user sees when the user is present in the environment. For example, a cloud server, television receiver 522, or another local or remote device may use data collected and determined based on the user(s) in the environment to determine which advertisements from a set of advertisements (e.g., stored on a database or detected from being broadcasted with television content) should be shown to the user(s). For example, since user 530 regularly watches sports, the system may insert an advertisement directed to a sports event, sports products, etc. to that user. Similarly, since user 531 is determined to regularly watch cartoons, the system may present advertisements regarding cartoon products when the user 531 is present in the environment (i.e., may be watching the television). In another embodiment, the system may detect and identify objects near the user or otherwise in the environment, which may yield additional data associated with the user(s). for example, if the user is drinking a beer (and, for example, is detected drinking more beers over time), data associated with the user's beer drinking habits, including frequency and type, may provide useful information for targeting advertisements or other content to the user(s). Methods associated with these customizations and targeted advertisements will be discussed further and in more detail with respect to FIGS. 7-8.

Those of skill in the art will recognize that many configurations of the electronic device 536 and television receiver 522 are possible in light of the present disclosure. All such other configurations of the electronic device 536 and television receiver 522 fall within the scope of the present disclosure.

Figure 6:
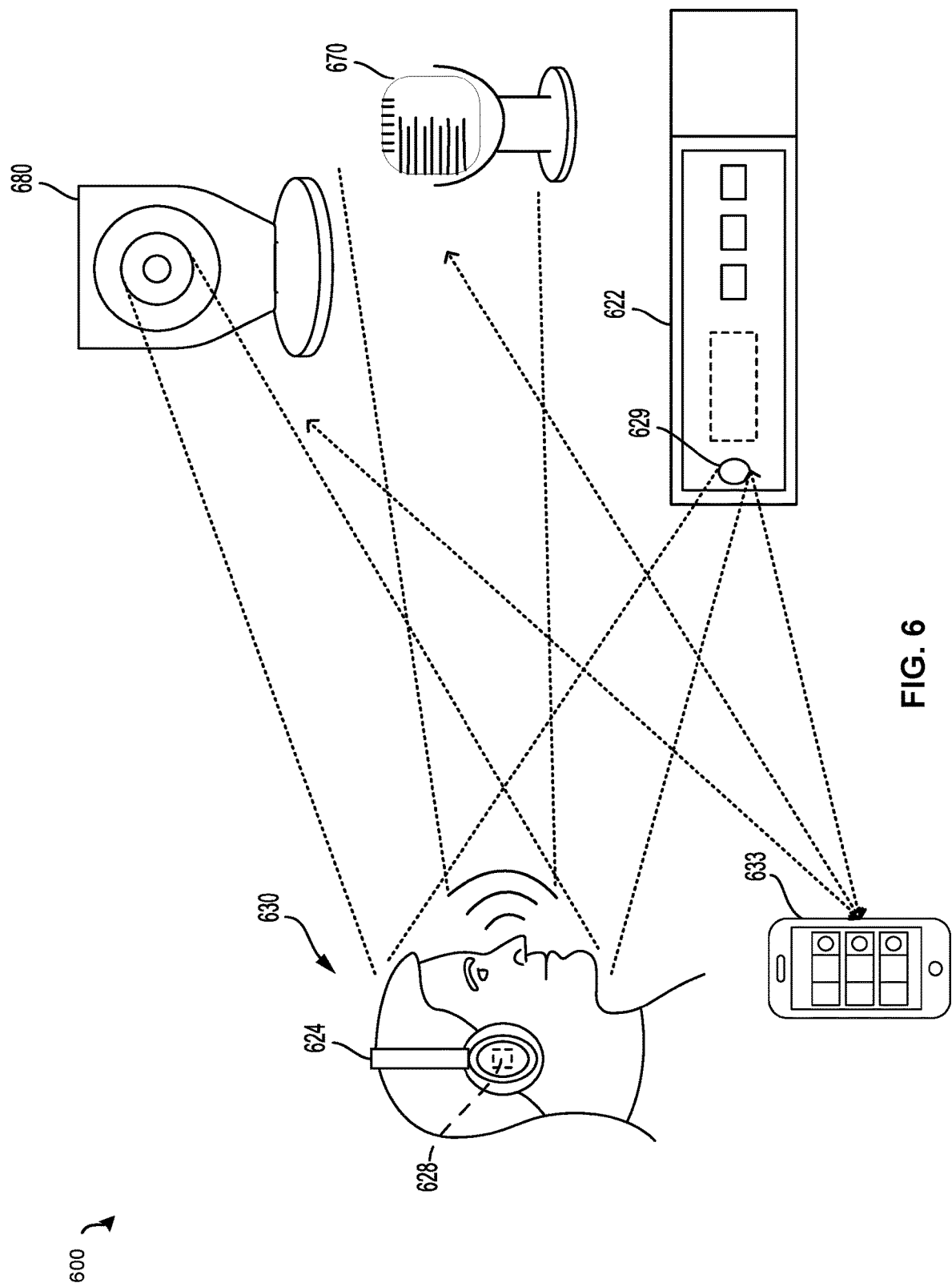
FIG. 6 illustrates a diagram of a user in an environment that includes various sensors of a media presentation system recording and collecting data of an environment including one or more users that may be used in accordance with embodiments of the present technology.

FIG. 6 illustrates a diagram of a user in an environment 600 that includes various sensors of a media presentation system recording and collecting data of an environment including one or more users that may be used in accordance with embodiments of the present technology. Diagram 600 includes four different types of sensors, although a media presentation system of the present technology may include a variety of other types of sensors. More specifically, diagram 600 includes a video camera sensor 680, an audio sensor 670, a sensor 629 (e.g., infrared) within television receiver 622, and a sensor 628 in a wireless headset 624. Video camera sensor 680 and audio sensor 670 (e.g. microphone) may capture video, images, and/or audio associated with people or objects in the environment viewed or in the vicinity of those sensors.

Sensor 629 in television receiver 622 may similarly capture data related to people (e.g., television receiver 622 users) or objects in the vicinity of the television receiver 622. More specifically, sensor 629 in television receiver 622 may capture data associated with a remote control device (not shown) that the sensor is configured to communicate with. The remote control device may allow a user to transmit inputs to the television receiver, or otherwise control the television receiver or any devices connected to or controlled by the television receiver. The sensor 629 may also communicate with or capture data associated with users or other mobile devices, such as a mobile phone 633 associated with user 630 of the television receiver or the environment. Therefore, the sensor 629 (and/or sensors 670 and 680) may capture and/or record information associated with the user based on the user's use of the mobile device, the user's movements with the mobile device, or other data. The sensor 629 may also be a different type of sensor and may communicate with such mobile devices in other ways, such as via Bluetooth, Wi-Fi, or other communication protocols. For example, sensor 629 may include a camera or video camera that may be configured to capture images or video within the environment, such as near the television receiver.

As noted, devices with sensors 680, 670, 628, and 629 may capture video, images, audio, etc. of users in the environment 600, as shown in FIG. 6. The sensors may record various different types of data. For example, the sensors may capture audio from the user's voice or from sounds in the environment around the user. Furthermore, the sensors may also include a camera or video camera to capture images and/or video. For example, sensor 628 may capture such data when the user is moving around inside or outside of the user's dwelling. The sensors may capture, for example, pictures, video and/or audio from users or objects located in the environment. Different types of software, such as facial recognition, object recognition, voice recognition, or others may be used to identify people or objects in the captured images and/or videos, and to generate additional data regarding the users and/or environment.

Data associated with the television receiver may also be used in conjunction with sensor-detected data. For example, if the user has interacted previously with the television receiver, data associated with those interactions may be used. More specifically, program content viewing data, such as which programming a certain user has watched, may be used. In other examples, user's selections using a remote control, such as settings (e.g., parental controls, volume, DVR settings and choices, etc.) may also be used to determine a user's characteristics, habits, patterns, and ultimately to target commercials to the user.

Such sensors may also be located on other types of mobile devices other than those shown in FIG. 6. For example, a sensor that captures such data may be located within a mobile phone, an automobile, a boat, an airplane, a smart watch, a set of smart glasses, or a variety of other types of devices or structures.

Once the data has been captured, the data may be analyzed to determine characteristics about the environment and/or the users in the environment. That collected data may be combined with data collected from other sources. The sources may include a television program from a television distribution service, data collected from the interne, data inputted by a user, data collected by the same or other sensors within a home automation network, among other sources. This analysis may be completed at, for example, the television receiver, at the device with the sensor where the data was recorded, another device within the television system, or at a remote device outside of the network.

Figure 7:
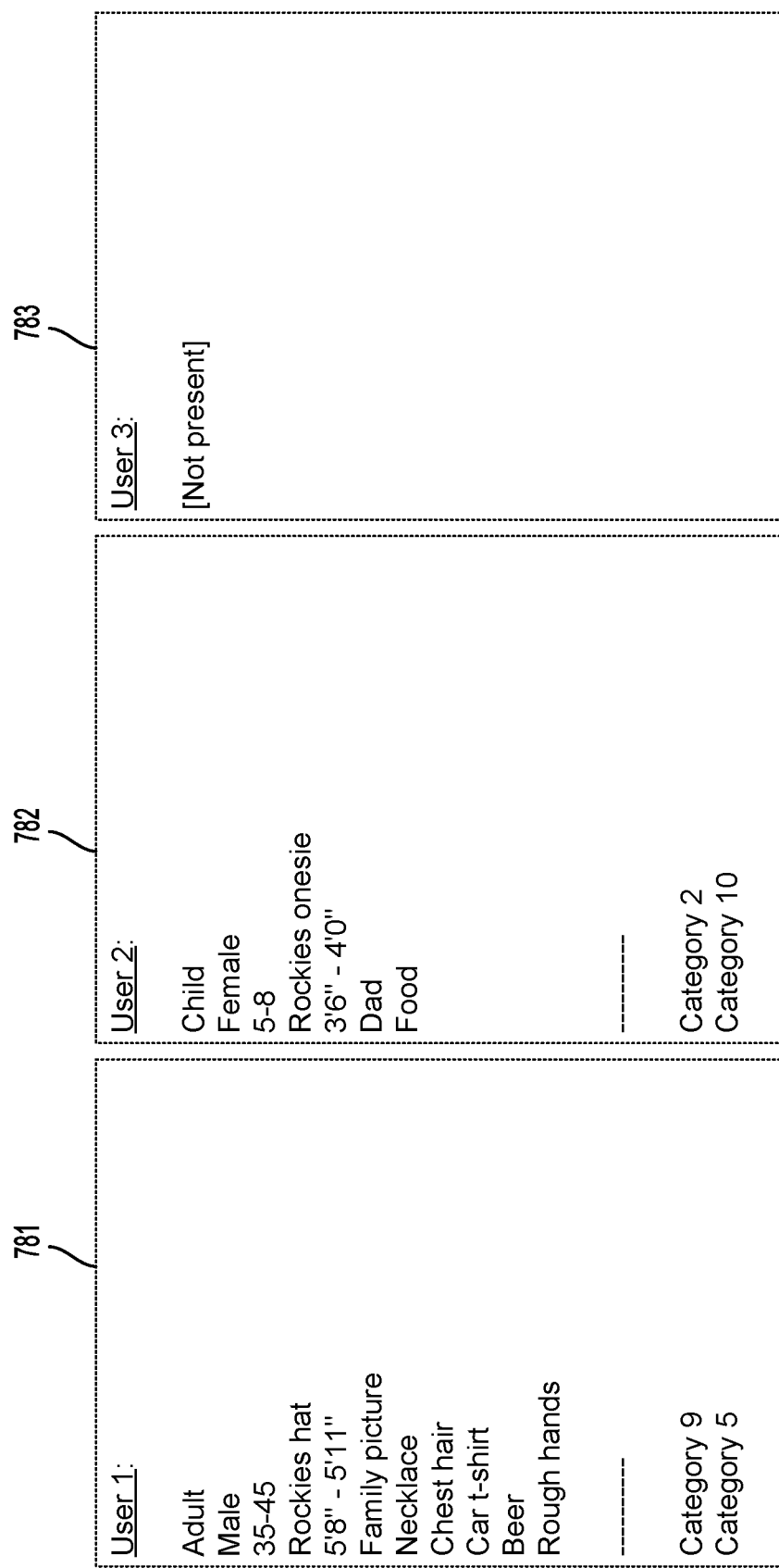
FIG. 7 illustrates an example set of lists including data associated with users of the media presentation system as may be used with embodiments of the present technology.

FIG. 7 illustrates an example set of lists including data associated with users of the media presentation system as may be used with embodiments of the present technology. As noted, if two users (e.g., users one and two) are detected and identified in the environment, the data collected by sensors in the environment (e.g., one or more sensors, such as sensor 629 in FIG. 6, in the television receiver) may be used to determine characteristics and other data associated with the users to assist the system in identifying targeted advertisements and other content to be presented to the user(s) when the user(s) are present in the environment. For example, certain characteristics (e.g., adult, male, age 35-45, wearing a Colorado Rockies hat, etc.) may be identified and associated with user one as shown in user data (e.g., profile) 781 and certain characteristics (e.g., child, female, age 5-8, wearing a Rockies onesie, etc.) may be identified and associated with user two as shown in user data 782. These characteristics may be associated with the users in profiles (e.g., profiles 781, 782 and 783 shown in FIG. 7) generated and associated with each user. The characteristics may be represented by tags, where the tags are assigned to a user or user profile so that the tags are associated with the users until the association is removed. As more data is collected, the set of characteristics and/or user profile may be updated (data added, removed, or changed) on the fly, dynamically, so that the user profiles are as up to date as possible.

If characteristics are identified by a device other than a television receiver (e.g., by a cloud network or server), then the associations/tags may be transmitted from the other device to the television receiver. The television receiver may then use the received data to determine which commercials or content should be targeted to which users. In another embodiment, that information may be predetermined by the transmitting device, and the television receiver may only be responsible for identifying open commercial slots and inserting assigned/associated commercials into the open slots based on the user(s) present in the environment at the time the slot will be presented. Once a commercial is identified, the receiver may transmit the commercial programming content to be displayed on a display device. Alternatively, the system may be an over-the-top (OTT) system such that the display device or television receiver may pull the chosen commercial content on a tailored playlist of commercial content.

Although user profiles 781, 782, and 783 are shown in FIG. 7 to look a certain way, the presentation of the profiles is only an example, and is only being shown as a set of data. A person of skill in the art would understand that other presentations of the user profile data are possible, or storage in a database without presentation may also suffice in certain embodiments of the present technology.

Predetermined categories may also be associated with each user based on the characteristics. Categories may be predetermined such that each category is defined by a certain set of predetermined characteristics, and a category may be automatically assigned to a user when the user has enough (e.g., over a certain threshold) categories that match with the category. In another embodiment, characteristics may be assigned rankings or weights based on how strong the characteristic is associated with that user. For example, a characteristic may have a high ranking or weight when the system has established that a user has strongly demonstrated that characteristic over a period of time (e.g., by repeating actions that represent that characteristic a certain number of times, over a certain time period, etc.). On the other hand, a characteristic may have a lower ranking or weight when the system has not established that a user has strongly demonstrated that characteristic over a period of time, or when the user has demonstrated actions or other information that runs contrary to that characteristic. Categories may be assigned, as noted, based on a number of overlapping characteristics with a user, or based on an average weight of characteristics as compared to a user. In some embodiments, the weights may also be based on how many times a user needs to see the content per an advertising campaign.

The assigned categories may also be associated with certain content and/or advertisements so that when a user is assigned to a category, content and/or advertisements associated with that category are used to target that user. Since multiple categories may be assigned to a user at any given time, the system may need to determine which content and/or advertisements are a higher priority for targeting that user. For example, categories may be assigned weights or rankings as well, either within a specific user profile or generally. For example, if a user is assigned to two categories (e.g., categories five and nine like user one in FIG. 7), then category nine may be identified as a higher ranking as category five based on each category's respective overlapping characteristics with the user, or based on a higher overall respective characteristic ranking for that category.

A user may be assigned a profile, as shown in FIG. 7, even if the user is not present in the environment, as shown in user profile 783, or even if the system has not collected any data regarding that user. However, when the user is present, or when the system collects data associated with the user even when the user is not present (e.g., via social media, the Internet, another user's inputs that are related to that non-present user, etc.), the user's profile may be updated with that new data. In another embodiment, a profile may be generated for a user when another user (e.g., a subscriber for the television system) inputs basic bibliographic or other data associated with that user. As noted, whatever data is collected regarding a user, that data may be used to determine content and/or advertisements to be targeted to that user.

Figure 8:
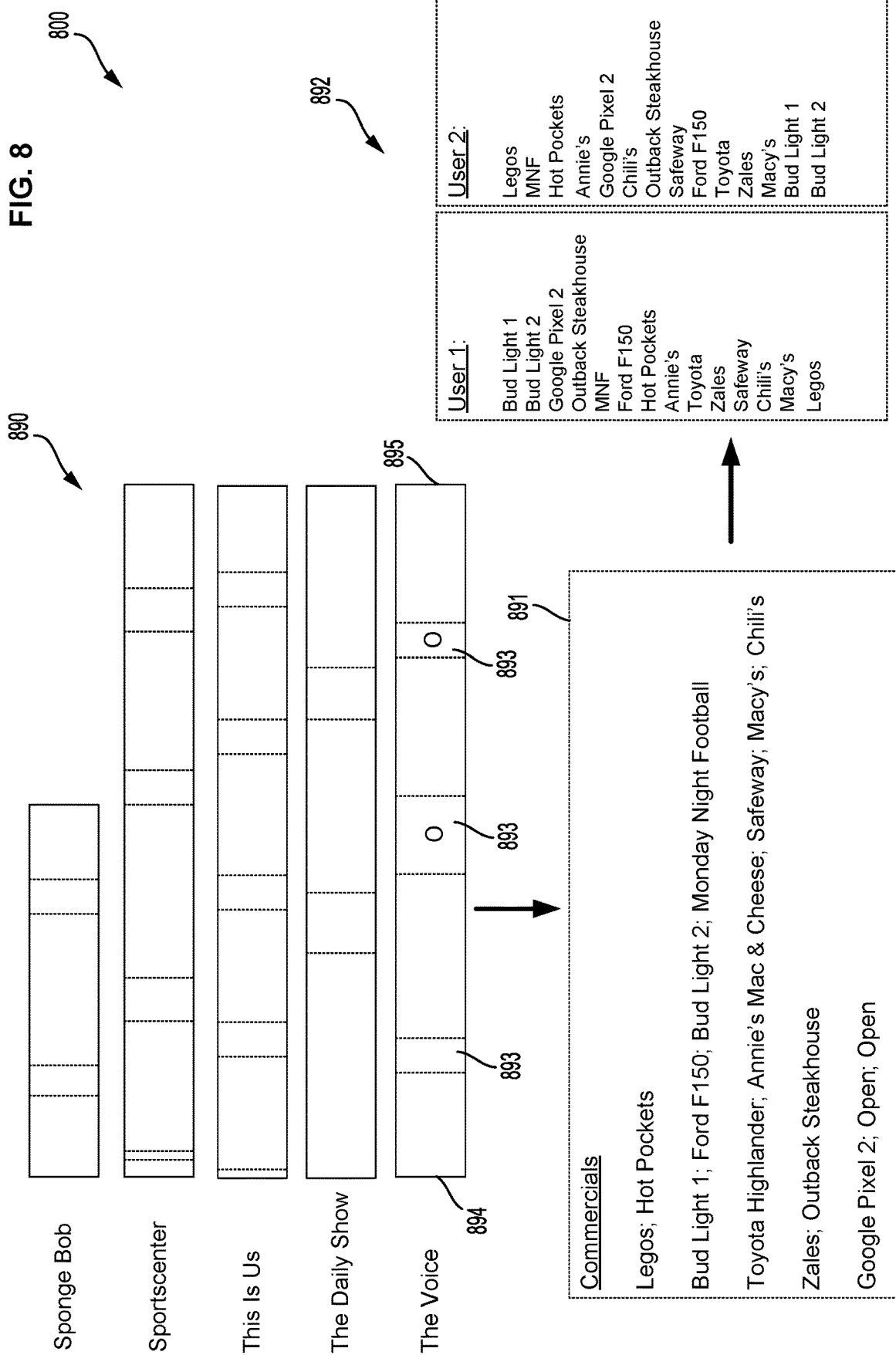
FIG. 8 illustrates a flow diagram showing how commercials may target a specific user using user data as may be used with embodiments of the present technology.

FIG. 8 illustrates a flow diagram 800 showing how advertisements (i.e., television commercials) may target a specific user using user data as may be used with embodiments of the present technology. The flow diagram 800 shows a variety of programming content timelines 890 including commercial slots 893 designated by dotted lines. For example, the programming content titled "The Voice" shows a timeline that begins at a beginning time 894 and ends at an ending time 895, and includes several commercial slots 893. However, while some of the programming content includes filled commercial slots, The Voice includes two "open" commercial slots as designated by "O". Therefore, the open commercial slots may be filled by targeted advertising.

An open commercial slot may be predetermined when the content is received by a television receiver as designated by the programming content provider. In another embodiment, the open commercial slot may be detected as blank placeholder content within the programming content, or as missing content from a section of the programming content. After the open commercial slot is detected, the system may determine how to fill the slot based on data collected about each user, detecting which users are present, user profiles, analysis of the weights/rankings associated with characteristics and/or categories within each user profile, and other information.

Information block 891 shows the different commercials assigned to each slot within the various programming content from timelines 890. For example, The voice may include a commercial for the Google Pixel 2 smartphone and two open commercial slots. However other television programs, such as Sponge Bob, may include two already-filled (with a Legos commercial and a Hot Pockets commercial) slots.

The television receiver, or other storage medium, may record and store (locally, in a cloud server, on another device, or otherwise) commercials from already-filled slots in order to generate a database of commercials. Such a collection of commercials may cause the generation of a list such as information block 891 in flow chart 800. In another embodiment, one or more commercials may be received by the television receiver from a content provider, from the owner of the commercials or commercial slots, or from other external resources. In either embodiment, the television receiver may use the database of commercial content to pull from when an open slot is detected. In another embodiment, the television receiver may request a certain commercial from a content provider or other resource after the receiver determines which commercial should be presented in a certain open slot.

As noted, to determine which commercial(s) should fill the open commercial content slot(s), data and/or profiles associated with the one or more users present in the environment may be used. That data and/or profiles may be used to rank the available commercials for each user based on the user data and characteristics associated with the users. As shown in the data shown in profiles 892 associated with each user (i.e., data shown in 892 may be a part of profiles associated with each user, or may be represented as tags or other associated information with the commercials list/database from block 891), the available commercials may be ranked in order based on the user's characteristics. For example, since user one may like to drink beer (as detected, for example, by sensors in the environment), Bud Light commercials may be ranked highest for user one. More specifically, a sensor may have captured an image of the user with a beer can, a sensor may have captured audio of a user drinking a liquid or of a can hitting a table, among other data associated with the user. In another example, a commercial for Legos may be at the top of a commercial list/ranking for user two because sensors captured data showing user two playing with Legos, or the system may have analyzed other data (e.g., the user's age, gender, etc.) to come to a determination that the user may like to play with Legos. Whichever commercial is at the top of the list for a given user may be presented in an open slow when that user is present. Other commercials in the list may be presented based on other factors, such as whether a certain commercial higher on the list was already presented, is unavailable, etc. Furthermore, if a certain commercial is chosen for user one, but also would be chosen for user two if user two was present, the commercial may not be shown until user two is present because the commercial is so highly ranked for user two even though it is the next commercial in line to be presented to user one.

The commercial lists, just as user profiles, may be dynamically updated over time based on new data collected or received. For example, if user one is determined to enjoy drinking beer over a certain period of time, but then the user is detected as not drinking beer over a subsequent period of time, then the system may determine that beer commercials should be moved to a lower ranking or weight on the list, especially if the user is more actively interested in other commercial content from lower in the list. Furthermore, commercial content may be added to the list if it becomes available, or removed from the list if it becomes unavailable. Furthermore, certain commercials may only be available to certain users but not to other users based on certain factors, such as parental controls or other predetermined settings from one or more users (e.g., a subscriber to the television content/system).

Figure 9:
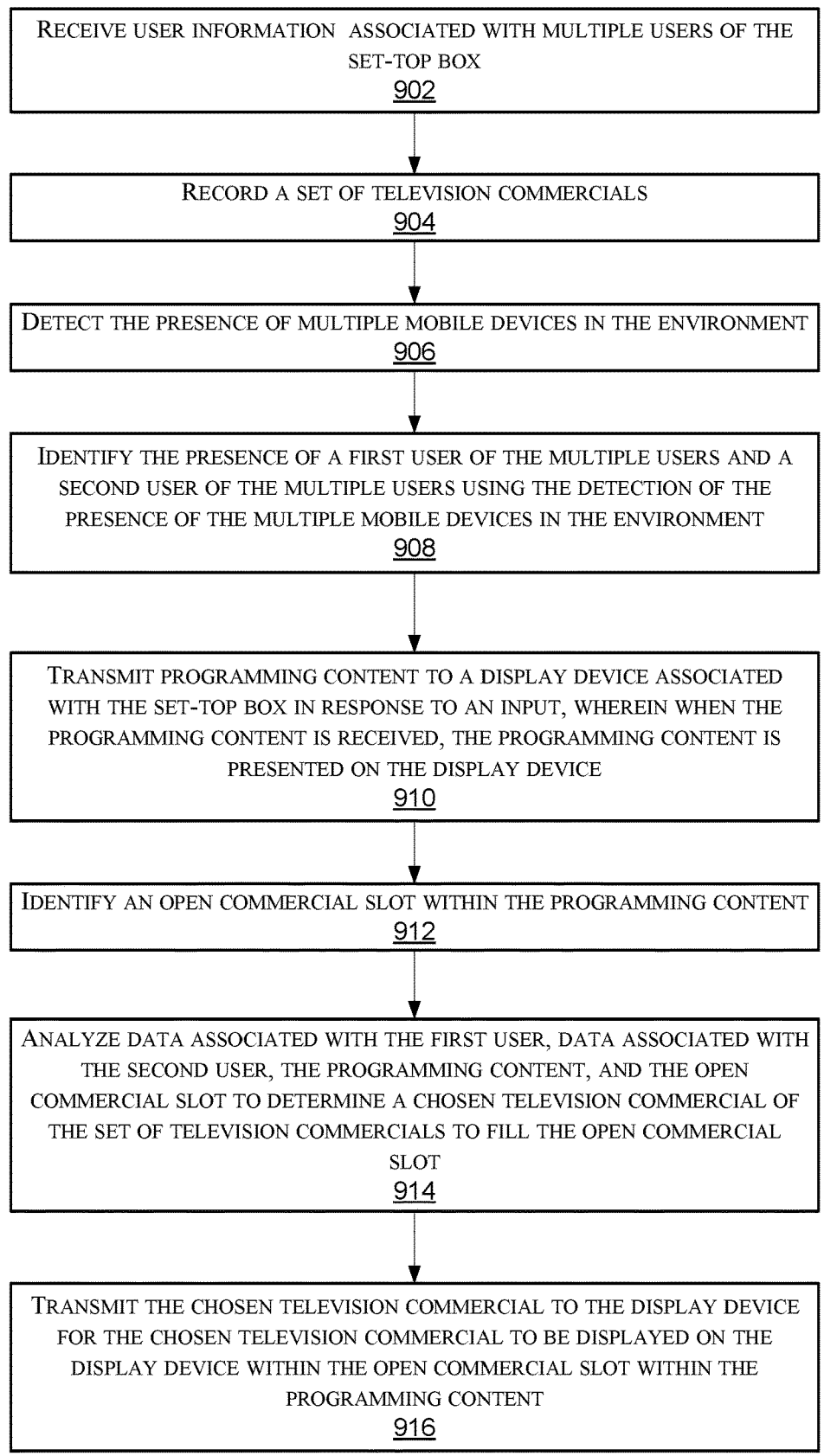
FIG. 9 includes a flow chart illustrating an example process associated with targeted ads based on user presence, according to embodiments of the present technology

FIG. 9 includes a flow chart illustrating an example process associated with targeted ads based on user presence, according to embodiments of the present technology. Step 902 may include, for example, receiving, at a set-top box in an environment, user information associated with multiple users of the set-top box. Step 904 may include, for example, recording, by the set-top box, a set of television commercials. Step 906 may include, for example, detecting, by the set-top box, the presence of multiple mobile devices in the environment. Step 908 may include, for example, identifying, by the set-top box, the presence of a first user of the multiple users and a second user of the multiple users using the detection of the presence of the multiple mobile devices in the environment. Step 910 may include, for example, transmitting, by the set-top box, programming content to a display device associated with the set-top box in response to an input, wherein when the programming content is received, the programming content is presented on the display device. Step 912 may include, for example, identifying, by the set-top box, an open commercial slot within the programming content. Step 914 may include, for example, analyzing, by the set-top box, data associated with the first user, data associated with the second user, the programming content, and the open commercial slot to determine a chosen television commercial of the set of television commercials to fill the open commercial slot; and step 916 may include, for example, transmitting, by the set-top box, the chosen television commercial to the display device for the chosen television commercial to be displayed on the display device within the open commercial slot within the programming content.

Figure 10:
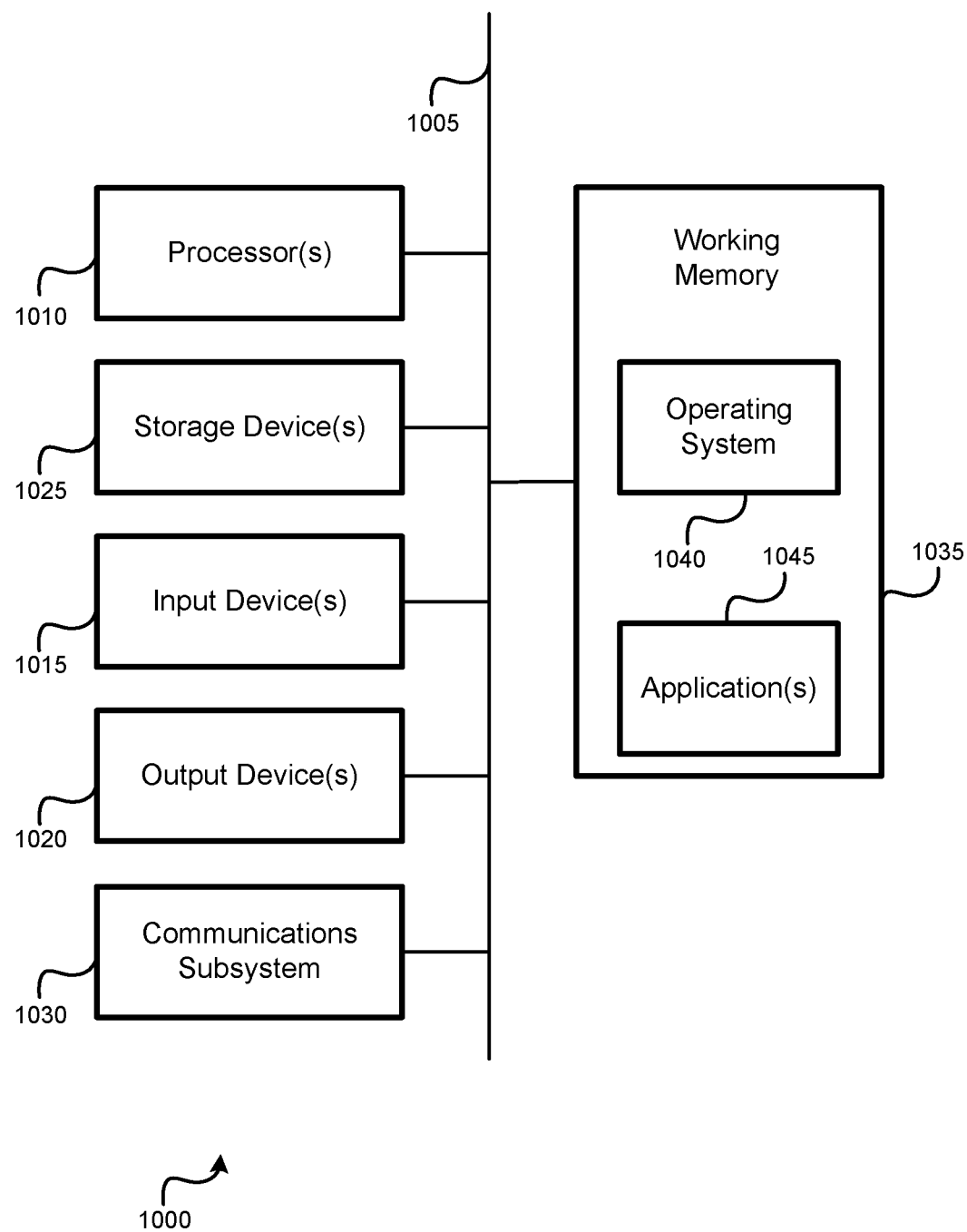
FIG. 10 shows a simplified computer system that may be utilized to perform one or more of the operations discussed.

FIG. 10 illustrates an embodiment of a computer system 1000. A computer system 1000 as illustrated in FIG. 10 may be incorporated into devices such as an STB, a first electronic device, DVR, television, media system, personal computer, and the like. Moreover, some or all of the components of the computer system 1000 may also be incorporated into a portable electronic device, mobile phone, or other device as described herein. FIG. 10 provides a schematic illustration of one embodiment of a computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

The computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1030 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1030. In other embodiments, a portable electronic device, e.g. the first electronic device, may be incorporated into the computer system 1000, e.g., an electronic device or STB, as an input device 1015. In many embodiments, the computer system 1000 will further comprise a working memory 1035, which can include a RAM or ROM device, as described above.

The computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, 6 or 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the procedures of such methods are performed by the computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computer-implemented method, comprising:
receiving, during a first period of time, at one or more sensors in communication with a set-top box in an environment, sensor-detected user information associated with multiple users in the environment, the sensor-detected user information indicating characteristics of each of the multiple users;
receiving and storing, by the set-top box, a set of television commercials including a first set of television commercials for already-filled commercial slots and a second set of television commercials for open commercial slots;
associating, by the set-top box, one or more categories with each of the multiple users based on the characteristics of each of the multiple users;
ranking, by the set-top box during the first period of time, each of the set of television commercials based on the characteristics of the one or more of the multiple users, such that each of the set of television commercials has an associated ranking;
transmitting, by the set-top box, programming content to a display device associated with the set-top box for presentation on the display device;
identifying, by the set-top box, a plurality of commercial slots in the programming content including at least an already-filled slot and an open commercial slot;
detecting, during the presentation on the display device of the programming content, during a second period of time subsequent to the first period of time, one or more of the multiple users as presently in the environment;
assigning a first chosen television commercial of the first set of television commercials for playback during the already-filled slot;
determining, by the set-top box during the second period of time, a second chosen television commercial of the second set of television commercials as having a highest of the associated rankings for the one or more of the multiple users detected as presently in the environment based on the ranking during the first period of time;
assigning, by the set-top box, the second chosen television commercial to fill the open commercial slot based on the determining; and
transmitting, by the set-top box, the first chosen television commercial to the display device for display during the already-filled commercial slot, and transmitting the second chosen television commercial to the display device for display during the open commercial slot.

2. The method of claim 1, further comprising:
receiving, at the set-top box, program content viewing data indicating television viewing habits of at least one of the multiple users via the set-top box,
wherein the one or more categories is associated with at least one of the multiple users based further on the program content viewing data.

3. The method of claim 1, further comprising:
assigning tags to television commercials within the set of television commercials based on the one or more categories associated with each of the multiple users; and
determining the chosen television commercial based on the tags assigned to each television commercial of the set of television commercials.

4. The method of claim 1, further comprising:
assigning, for each of the characteristics of each of the multiple users, a ranking or weight based on how strong the characteristic is associated with the user, such that each of the multiple users is associated with weighted characteristics, wherein associating the one or more categories with each of the multiple users is based on the weighted characteristics of each of the multiple users.

5. The method of claim 1, wherein at least one of the one or more sensors is integrated in the set-top box.

6. The method of claim 1, wherein:
at least one of the one or more sensors is integrated into a wireless headset worn by a first user of the multiple users to monitor a physical state of the first user; and
the sensor-detected user information further indicates the physical state of the first user.

7. The method of claim 1, wherein the sensor-detected user information further indicates detection and identification information for objects in the environment.

8. A television receiver, comprising:
one or more processors;
a wireless transceiver communicatively coupled to the one or more processors;
a non-transitory computer readable storage medium communicatively coupled to the one or more processors, wherein the non-transitory computer readable storage medium includes instructions that, when executed by the one or more processors, cause the one or more processors to perform operations including:
receiving, during a first period of time, at one or more sensors in communication with a set-top box in an environment, sensor-detected user information associated with multiple users in the environment, the sensor-detected user information indicating characteristics of each of the multiple users;
receiving and storing, by the set-top box, a set of television commercials including a first set of television commercials for already-filled commercial slots and a second set of television commercials for open commercial slots;
associating, by the set-top box, one or more categories with each of the multiple users based on the characteristics of each of the multiple users;
ranking, by the set-top box during the first period of time, each of the set of television commercials based on the characteristics of the one or more of the multiple users, such that each of the set of television commercials has an associated ranking;
transmitting, by the set-top box, programming content to a display device associated with the set-top box for presentation on the display device;
identifying, by the set-top box, a plurality of commercial slots in the programming content including at least an already-filled slot and an open commercial slot;
detecting, during the presentation on the display device of the programming content, during a second period of time subsequent to the first period of time, one or more of the multiple users as presently in the environment;
assigning a first chosen television commercial of the first set of television commercials for playback during the already-filled slot;
determining, by the set-top box during the second period of time, a second chosen television commercial of the second set of television commercials as having a highest of the associated rankings for the one or more of the multiple users detected as presently in the environment based on the ranking during the first period of time;
assigning, by the set-top box, the second chosen television commercial to fill the open commercial slot based on the determining; and
transmitting, by the set-top box, the first chosen television commercial to the display device for display during the already-filled commercial slot, and transmitting the second chosen television commercial to the display device for display during the open commercial slot.

9. The television receiver of claim 8, the operations further including:
receiving, at the set-top box, program content viewing data indicating television viewing habits of at least one of the multiple users via the set-top box,
wherein the one or more categories is associated with at least one of the multiple users based further on the program content viewing data.

10. The television receiver of claim 8, the operations further including:
assigning tags to television commercials within the set of television commercials based on the one or more categories associated with each of the multiple users; and
determining the chosen television commercial based on the tags assigned to each television commercial of the set of television commercials.

11. The television receiver of claim 8, the operations further including:
assigning, for each of the characteristics of each of the multiple users, a ranking or weight based on how strong the characteristic is associated with the user, such that each of the multiple users is associated with weighted characteristics,
wherein associating the one or more categories with each of the multiple users is based on the weighted characteristics of each of the multiple users.

12. The television receiver of claim 8, wherein at least one of the one or more sensors is integrated in the set-top box.

13. The television receiver of claim 8, wherein:
at least one of the one or more sensors is integrated into a wireless headset worn by a first user of the multiple users to monitor a physical state of the first user; and
the sensor-detected user information further indicates the physical state of the first user.

14. The television receiver of claim 8, wherein the sensor-detected user information further indicates detection and identification information for objects in the environment.

15. A computing device, comprising:
one or more processors; and
a memory having instructions stored thereon, which when executed by the one or more processors, cause the computing device to perform operations including:
receiving, during a period of time, at one or more sensors in communication with a set-top box in an environment, sensor-detected user information associated with multiple users of the environment, the sensor-detected user information indicating characteristics of each of the multiple users;
receiving and storing, by the set-top box, a set of television commercials for open commercial slots;
ranking, by the set-top box during the period of time, each of the set of television commercials based on the characteristics of the one or more of the multiple users, such that each of the set of television commercials has an associated ranking;

transmitting, by the set-top box, programming content to a display device associated with the set-top box for presentation on the display device;

identifying, by the set-top box, an open commercial slot within the programming content;

detecting, during the presentation on the display device of the programming content and subsequent to the period of time, one or more of the multiple users as presently in the environment;

determining, by the set-top box during the presentation on the display device of the programming content, a chosen television commercial of the set of television commercials as having a highest of the associated rankings for the one or more of the multiple users detected as presently in the environment based on the ranking during the period of time;

assigning, by the set-top box based on the determining, the chosen television commercial to fill the open commercial slot; and transmitting, by the set-top box, the chosen television commercial to the display device for display on the display device during the open commercial slot.

16. The computing device of claim 15, the operations further including:

assigning tags to television commercials within the set of television commercials based on the one or more categories associated with each of the multiple users; and determining the chosen television commercial based on the tags assigned to each television commercial of the set of television commercials.

17. The computing device of claim 15, wherein the instructions further comprise:

assigning, for each of the characteristics of each of the multiple users, a ranking or weight based on how strong the characteristic is associated with the user, such that each of the multiple users is associated with weighted characteristics, wherein associating the one or more categories with each of the multiple users is based on the weighted characteristics of each of the multiple users.

18. The computing device of claim 15, wherein at least one of the one or more sensors is integrated in the set-top box.

19. The computing device of claim 15, wherein:

at least one of the one or more sensors is integrated into a wireless headset worn by a first user of the multiple users to monitor a physical state of the first user; and the sensor-detected user information further indicates the physical state of the first user.

20. The computing device of claim 15, wherein the sensor-detected user information further indicates detection and identification information for objects in the environment.

* * * * *